(12) United States Patent
Zeng et al.

(10) Patent No.: US 10,754,637 B1
(45) Date of Patent: Aug. 25, 2020

(54) PATCH MANAGEMENT IN A HYBRID COMPUTING ENVIRONMENT

(71) Applicant: International Business Machines Corporation, Armonk, NY (US)

(72) Inventors: Sai Zeng, Yorktown Heights, NY (US); Alexei Karve, Mohegan Lake, NY (US); Ubaid Ullah Hafeez, Stony Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/259,205

(22) Filed: Jan. 28, 2019

(51) Int. Cl.
| | |
|---|---|
| *G06F 8/65* | (2018.01) |
| *G06F 9/50* | (2006.01) |
| *G06F 9/455* | (2018.01) |
| *H04L 29/08* | (2006.01) |
| *H04L 29/06* | (2006.01) |
| *G06F 8/61* | (2018.01) |

(52) U.S. Cl.
CPC .............. *G06F 8/65* (2013.01); *G06F 8/62* (2013.01); *G06F 9/45558* (2013.01); *G06F 9/5038* (2013.01); *G06F 9/5077* (2013.01); *H04L 63/1433* (2013.01); *H04L 67/34* (2013.01)

(58) Field of Classification Search
CPC ..................................... G06F 8/65; G06F 8/62
USPC ................................................. 717/168–178
See application file for complete search history.

(56) References Cited

U.S. PATENT DOCUMENTS

| | | | |
|---|---|---|---|
| 6,847,970 B2 | 1/2005 | Keller et al. | |
| 8,839,221 B2 | 9/2014 | Sapuntzakis et al. | |
| 9,047,133 B2 | 6/2015 | Winterfeldt et al. | |
| 2007/0169079 A1 | 7/2007 | Keller et al. | |
| 2008/0178173 A1* | 7/2008 | Sriram | G06F 8/61 717/176 |
| 2013/0047147 A1* | 2/2013 | McNeill | G06F 8/65 717/173 |
| 2016/0103673 A1* | 4/2016 | Curran | G06F 8/65 717/168 |

(Continued)

OTHER PUBLICATIONS

Brykczynski, Bill, and Robert A. Small. "Reducing internet-based intrusions: Effective security patch management," IEEE software20.1 (2003): pp. 50-57. (Year: 2003).*

(Continued)

*Primary Examiner* — Satish Rampuria
(74) *Attorney, Agent, or Firm* — Amin, Turocy & Watson, LLP

(57) ABSTRACT

Managing performing patches on a workload associated with a computing platform comprising: identify the workload associated with the computing platform, wherein the workload can comprise a first workload portion upon which a first subset of patches can be performed offline and a second workload portion upon which a second subset of patches can be performed online; determine, for the first workload portion, a portion of the first subset of patches that can be performed within a maintenance time window while offline based on vulnerability scores of patches of the first subset of patches, and determine, for the second workload portion, the second subset of patches that can be performed while online; and determine the vulnerability scores of the patches of the first subset of patches based on importance levels of the patches.

25 Claims, 9 Drawing Sheets

(56) References Cited

U.S. PATENT DOCUMENTS

2016/0259638 A1    9/2016    El Maghraoui et al.
2018/0011700 A1*    1/2018    Plate .......................... G06F 8/65
2018/0060057 A1    3/2018    Dake
2018/0081676 A1    3/2018    Lindholm et al.
2019/0289029 A1*    9/2019    Chawla ............... H04L 63/0272

OTHER PUBLICATIONS

Padhy, Rabi Prasad, Manas Ranjan Patra, and Suresh Chandra Satapathy. "Cloud computing: security issues and research challenges." International Journal of Computer Science and Information Technology & Security (IJCSITS)1.2 (2011): pp. 136-146. (Year: 2011).*

Purcell, Bernice M. "Big data using cloud connputing." Journal of Technology Research5 (2014): pp. 1-9 (Year: 2014).*

Nicolett, Mark, and Ronni Colville. "Robust patch management requires specific capabilities." Technology 19 (2003): 4570.pp. 1-4 (Year: 2003).*

Liu, Simon, Rick Kuhn, and Hart Rossman. "Surviving insecure it: Effective patch management." IT professional 11.2 (2009): pp. 49-51. (Year: 2009).*

Gerace, Thomas, and Huseyin Cavusoglu. "The critical elements of patch management." Proceedings of the 33rd annual ACM SIGUCCS conference on User services. 2005.pp. 98-101 (Year: 2005).*

Hurwitz et al., "Types of Workloads in a Hybrid Cloud Environment," https://www.dummies.com/programming/cloud-computing/hybrid-cloud/types-of-workloads-in-a-hybrid-cloud-environment/, 5 pages.

Lindstrom, "A Patch in Time: Considering automated patch management," https://searchsecurity.techtarget.com/A-Patch-in-Time-Considering-automated-patch-management-solutions, 6 pages.

* cited by examiner

US 10,754,637 B1

PATCH MANAGEMENT IN A HYBRID COMPUTING ENVIRONMENT

BACKGROUND

The subject disclosure relates to computer-related systems, and more specifically, to patch management in a hybrid computing environment.

SUMMARY

The following presents a summary to provide a basic understanding of one or more embodiments of the disclosed subject matter. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, or computer program products that can facilitate managing application of patches associated with a workload of a computing system.

According to an embodiment, a computer-implemented method comprises determining, by a system operatively coupled to a processor, a workload that is associated with a computing platform, wherein the workload comprises a first workload portion upon which a first subset of patches is to be performed. The computer-implemented method also comprises determining, by the system, a second subset of patches to apply to a portion of the first workload portion within a maintenance time window based on vulnerability scores of patches of the first subset of patches, wherein the first subset of patches comprises the second subset of patches.

In some embodiments, elements described in connection with the disclosed methods can be embodied in different forms such as a system, a computer program product, or another form.

According to another embodiment, a system can comprise a memory that stores computer-executable components; and a processor, operatively coupled to the memory, that executes computer-executable components. The computer-executable components can comprise an update identifier component that identifies a workload that is associated with a computing platform, wherein the workload comprises a first workload portion upon which a first subset of updates is to be performed and a second workload portion upon which a second subset of updates is to be performed. The computer-executable components also can include an update management component that determines a third subset of updates to apply to a portion of the first workload portion within a maintenance time period based on vulnerability scores of updates of the first subset of updates associated with the first workload portion, wherein the first subset of updates comprises the third subset of updates.

In some embodiments, elements described in connection with the disclosed systems can be embodied in different forms such as a computer-implemented method, a computer program product, or another form.

These and other features will become apparent from the following detailed description of illustrative embodiments thereof, which is to be read in connection with the accompanying drawings.

DETAILED DESCRIPTION

Figure 1:
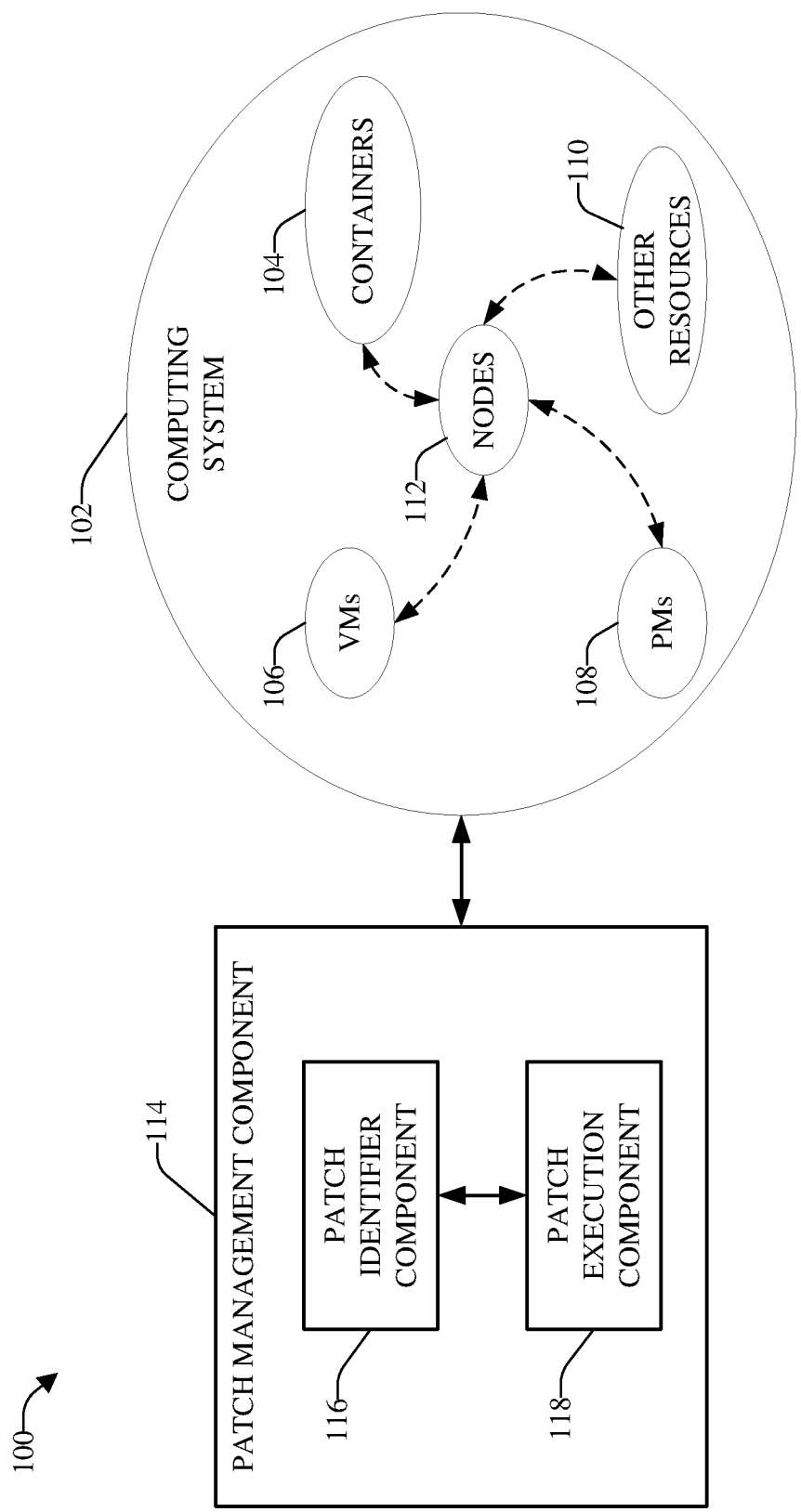
FIG. 1 illustrates a block diagram of an example, non-limiting system that can be utilized to efficiently managing and applying patches on a computing system, in accordance with various aspects and embodiments of the disclosed subject matter.

The following detailed description is merely illustrative and is not intended to limit embodiments or application or uses of embodiments. Furthermore, there is no intention to be bound by any expressed or implied information presented in the preceding Background or Summary sections or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Malware attacks can bring down computer-related systems and can cost companies and other entities a significant amount of money (e.g., thousands of dollars, tens of thousands of dollars, hundreds of thousands of dollar, . . . ) in downtime and recovery cost. Companies typically do not have the time and resources to patch thousands of systems (e.g., computer-related systems), while others commit time and resources they can ill afford.

Automated patching of computer-related systems can be a cost-effective alternative to the drain of manual patching of computer-related systems and the risks of not patching computer-related systems. It can be useful and desirable to measure the cost of patching and not patching computer-related systems or portions thereof, against the level of risk, and, from such measurement of the cost relative to the risk, determining when to perform patches and what patches to perform.

Another consideration with regard to patching can be that patching time generally is not a constant, and a number of factors can have an impact on patching. Heterogeneity of systems (e.g., variations in platforms, configurations, and deployed applications of systems) can increase the chances that at least some patches will fail because non-standard systems can be relatively hard to test.

Still another consideration can be that it typically can be better to patch computer-related systems or portions thereof, at the earliest point in time where the cost to perform the patch can be less than or equal to the cost of not patching. The risk to unpatched computer-related systems typically can increase significantly (e.g., dramatically) once an exploit to a computer-related system(s) is publicly available.

Yet another consideration can be that patches to computer-related systems sometimes can have flaws. As a result, it can be desirable to be able to validate that a patch or the computer-related system upon which the patch was implemented are performing acceptably after the patch is implemented, and, if the patch or the computer-related system are not performing acceptably, it can be desirable to rollback or undo the patch to return the computer-related system to its previous state, prior to the patch being implemented.

There can be further and significant challenges when performing patches on hybrid workloads of computer-related systems. Computing conditions and specifications can be varied, and the workloads can be varied as well. A hybrid workload can consist of (e.g., can span across) multiple dimensions, including, for example, a multi-cloud or multi-operating system architecture, a type of cloud deployment model (e.g., traditional computing infrastructure, private cloud or public cloud; on premises and off premises; dedicated or shared; . . . ), a type of deployment (e.g., bare metal machine, virtual machine (VM), container, external service, . . . ), a type of workload (e.g., batch workload, transactional workload, analytic workload, high performance workload, database workload or central processing unit (CPU), disk or processor intensive workload, . . . ), a frequency of performing patches (e.g., a monthly or month-end patching, seasonal variability of patching, . . . ) or development and operations (DevOps) processes. Also, there can be dependencies between multiple tiers (e.g., nodes) of the workload.

Further, patching of nodes can be performed online or live, for example, with regard to a clustered or always on service or offline, wherein the patching is to be performed while the nodes and associated application(s) are offline. Another challenge can be that there typically can be a limited downtime window available in which patches can be performed on nodes and associated applications while offline. Still another challenge to be considered is that there can be variation in the importance, priority or vulnerability (e.g., vulnerability score) associated with patches, as, for example, some patches can have a high level of importance, other patches can have a medium level of importance, and still other patches can have a relatively low level of importance. Also, it is noted that, currently, users (e.g., customers) typically can be responsible for separately patching the operating system, middleware, and applications within the confines of the applicable infrastructure.

To that end, the various embodiments herein relate to techniques for managing patches in a computing environment, such as, for example, a hybrid computing environment (e.g., hybrid cloud computing environment). A patch identifier component can identify a workload associated with a computing platform. The workload can comprise a first workload portion upon which a first subset of patches can be performed offline and a second workload portion upon which a second subset of patches can be performed online. A patch management component (PMC) can determine, for the first workload portion, a portion (e.g., a third subset) of the first subset of patches that can be performed on a portion of the first workload portion within a maintenance time window while offline based on vulnerability scores of patches of the first subset of patches, and can determine, for the second workload portion, the second subset of patches that can be performed while online. The PMC can determine the vulnerability scores of the patches or group vulnerability scores of groups of patches (e.g., different groupings of the patches), based at least in part on the relative importance levels of the patches to facilitate determining the portion (e.g., third subset) of the first subset of patches to apply during the maintenance time window as well as the second subset of patches to apply to the second workload portion. In some embodiments, at least some of the patches of the third subset of patches can be applied simultaneously or in parallel with each other or at least some of the patches of the second subset of patches can be applied simultaneously or in parallel with each other or with at least some of the patches of the third subset of patches.

A patch execution component can perform the third subset of patches on the portion of the first workload portion, within the maintenance time window, while the first workload portion is offline, and the second subset of patches on the second workload portion, wherein the second workload portion can be online while such patches are performed (e.g., applied). The PMC can validate the patches applied and associated workload, while still within the maintenance time window, to ensure that the patches and associated workload are performing properly. If the PMC determines that a patch is not validated (e.g., such patch or associated workload item(s) is not performing properly after the patch is applied), the PMC can revert the patch, within the maintenance time window, to return the workload item(s) to its previous state prior to the patch being applied.

These and other aspects and embodiments of the disclosed subject matter will now be described with respect to the drawings.

FIG. 1 illustrates a block diagram of an example, non-limiting system 100 that can be utilized to efficiently managing and applying patches on a computing system, in accordance with various aspects and embodiments of the disclosed subject matter. The system 100 can comprise a computing system 102 that can comprise various components. The computing system 102 can comprise one or more networks (e.g., computing or communication networks). In some embodiments, the computing system 102 can be multi-dimensional, wherein the computing system 102 can span across multiple dimensions and can comprise workloads (e.g., hybrid workloads) that can span across the multiple dimensions of the computing system 102. For instance, the computing system 102 can comprise a multi-cloud or multi-operating system architecture, can employ a multi-dimensional deployment model (e.g., traditional computing infrastructure, private cloud or public cloud; on premises and off premises; dedicated or shared), can employ various types of components or devices (e.g., bare metal machine, VM, container, external service, . . . ) that can span across multiple tiers or multiple parts of the multi-dimensional deployment model, can involve various types of workloads (e.g., batch workload, transactional workload, analytic workload, high performance workload, database workload or CPU, disk or processor intensive workload, . . . ) that can span across the multiple dimensions of the computing system 102, can comprise DevOps processes or other features that can span across the multiple dimensions of the computing system 102, as more fully described herein.

The computing system 102 can comprise various containers 104, virtual machines (VMs) 106, physical machines (PMs) 108, other resources 110, and nodes 112 that can be arranged in relation to each other or associated with each other to form the computing system 102 and to provide various services (e.g., computing-related services and applications). For instance, the various containers 104, VMs 106, PMs 108, other resources 110 or nodes 112 or can span across multiple dimensions of the computing system 102 and can be arranged in multiple tiers (e.g., a container 104 can be in a first tier and can be associated with another container 104 or a VM 106 in a second tier or the other container 104 or VM 106 can be associated with another VM 106 or PM 108 in a third tier, . . . ), as more fully described herein. In accordance with various embodiments, a container 104, VM 106, PM 108 or other resource 110 can be, can be part of or can be associated with a node 112.

At various times, it can be desirable to apply patches to computer programs or associated data to enhance the computing system 102. A patch can be a piece of software designed to update a computer program or its supporting data, to fix or improve the computer program. A patch can include fixing security vulnerabilities or other bugs or improving the usability or performance of the computer program with upgrades to the computer program. Patches on a node, which can belong to one or more tiers, typically are not limited to the operating system (e.g., first type of operating system, second type of operating system, third type of operating system, etc.), but also can apply to the software (e.g., application, middleware or database) installed on the node.

To facilitate applying patches, the system 100 can comprise a patch management component (PMC) 114 (also referred to as an update management component) that can manage (e.g., control) the application of patches to the various containers 104, VMs 106, PMs 108, other resources 110, nodes 112, applications, associated data, etc., in accordance with defined patch management criteria and an associated patch management algorithm(s). The PMC 114 can include a patch identifier component 116 (also referred to as an update identifier component) that can identify or determine patches to perform (e.g., during a maintenance time window), and a patch execution component 118 (also referred to as an update execution component) that can perform or execute (e.g., apply) patches (e.g., selected patches) on (or to) the various containers 104, VMs 106, PMs 108, other resources 110, nodes 112, applications or associated data, etc.

Some patches can be performed on some components (e.g., container 104, VM 106, PM 108 or other resource 110 or node 112 . . . ) of the system 100 while such components are online, whereas certain patches are not able to be applied to certain components (e.g., certain containers 104, VMs 106, PMs 108, other resources 110 or nodes 112, . . . ) of the system 100 until such certain components are taken offline. There typically can be a relatively short amount of time (e.g., a maintenance time window) during which components can be taken offline to apply patches. Further, different patches can be associated with different levels of vulnerability, priority, importance or risk. Thus, since the maintenance time window can be limited, it can be desirable to prioritize the application of some patches (e.g., patches associated with a higher level of vulnerability, priority, importance or risk) over other patches (e.g., patches associated with a relatively lower level of vulnerability, priority, importance or risk) during the maintenance time window.

In accordance with various embodiments, for a given maintenance time window, the PMC 114 can identify a workload, comprising a first workload portion for which patches are to be applied while the first workload portion is offline and a second workload portion for which patches can be applied while the second workload portion is online, can determine a subset of patches that can be applied during the maintenance time window, while the first workload portion is offline, based at least in part on vulnerability scores associated with the patches, in accordance with defined patch management criteria and associated patch management algorithm(s), as more fully described herein. In determining which patches to perform (e.g., during a maintenance time window), the PMC 114 can take into account various features regarding containers 104, VMs 106, PMs 108, other resources 110, nodes 112, applications, etc., including features relating to the application of patches to containers 104, VMs 106, PMs 108, other resources 110, nodes 112, applications, etc.

For instance, with regard to patching containers (e.g., containers 104) associated with a container platform (e.g., for certain types of container platforms), running containers usually are not patched. Instead, for a container (e.g., 104), the image used by the container can be patched (e.g., by the patch execution component 118), while the container is still running (e.g., online), and the container can be restarted with the new patched container image. The application running on the container can be brought down (e.g., by the PMC 114) when the new container (e.g., new container image) is started, and therefore, the application can incur a stop and start time in connection with the patching of the container image.

With regard to patching VMs (e.g., VMs 106), patching a VM can incur stop and start time for the application and often can require a reboot (e.g., by the PMC 114). Additionally, after the application is stopped (e.g., by the PMC 114), the patch execution component 118 can patch the VM instance (not the image) of a VM (e.g., VM 106), and therefore, the VM instance can incur the patching time for each of the applicable patches for the VM before the PMC 114 restarts the application.

As indicated, there typically can be a limited window during which offline patching can be performed by the patch execution component 118. For instance, for containers 104 or VMs 106 that are not clustered, there can be a limited maintenance time window (e.g., maintenance downtime window) within which the patching process can incur the stop and start time of an application and reboot and restart time for containers 104 and VMs 106. The patching time can be incurred for VMs 106 within this limited maintenance time window. Due to the limited (e.g., relatively short) amount of time available during the maintenance time window, typically the patch execution component 118 can only apply a partial subset of patches during the maintenance time window. With regard to the patching of containers 104, containers typically do not incur this patching time because the images of the containers can be patched outside of this maintenance time window (e.g., while containers 104 and other resources are online). Therefore, for containers 104, the patch execution component 118 typically can apply patches (e.g., can apply all patches) to containers 104 (e.g., while online or offline).

With regard to online patching, for example, for certain types of container platforms (e.g., container platforms that can support rolling updates), the patch execution component 118 (e.g., as managed by the PMC 114) can perform a rolling update (e.g., a rolling patching), wherein replication controllers can be employed that can increase or decrease the replica count on the new and old controllers until the desired (e.g., correct) number of replicas is reached (e.g., achieved). For instance, a pod can comprise one or more containers. A replication controller can ensure that a desired (e.g., a specified) number of pod replicas (also referred to as a replica count or copies of the pods) are running at any given time (e.g., running simultaneously on one or more nodes). The replication controller can manage (e.g., supervise) multiple pods across multiple nodes. For instance, if the replication controller determines that there are too many pods, the replication controller can terminate the extra pods, and if it determines that there are not enough pods, the replication controller can start or create more pods. To update a service without there being a service outage, the patch execution component 118 can perform a rolling update on the pods, which can update one pod at a time, rather than taking the entire service (e.g., all of the pods of the service) at the same time. The workload portion associated with the service (and thus, the service) can continue to function even though, at various times during the update, some of the nodes (e.g., belonging to the replica count) that are executing on this workload portion can be taken down for patching. In some embodiments, if the PMC 114 determines that the replica count with respect to a pod is greater than one, the PMC 114 can determine that the pod can be patched live (e.g., online). This can allow deployments' update to occur with zero downtime by having the patch execution component 118 incrementally update pods instances with new ones with a requested batch size. High availability applications (e.g., certain application servers) on VMs 106 or containers 104 can allow the PMC 114, including the patch execution component 118, to perform an automatic application rollout update process that can stop or pause each application server that is hosting a cluster member for which updating is to be performed without application downtime. A high availability disaster recovery (HADR) environment, when you upgrade software or hardware, can allow the PMC 114, including the patch execution component 118, to update database-related software (e.g., database product software) or change (e.g., modify, adjust) database configuration parameters, while keeping the database service available throughout the rolling update process, with only a momentary service interruption when processing is switched from one database to the other.

In connection with managing the patching, the PMC 114 also can take into account other features or factors of the computing system 102 (e.g., hybrid cloud computing system) to facilitate determining which patches to implement during a given time period (e.g., a maintenance time window), in accordance with the defined patch management criteria. For instance, with regard to a hybrid cloud, the hybrid cloud can implement a plug-and-play approach for using cloud platforms and services from different providers or vendors. These clouds can comprise private or public clouds or off-premises or on-premises clouds, and can be or can comprise, containers 104, VMs 106, PMs 108, etc., as more fully described herein.

In some embodiments, the computing system 102 can employ multi-tier applications that can comprise various dependencies (e.g., dependencies between tiers). Multi-tier applications can allow the presentation, application processing, business processing, and data management functions to be physically separated. Tiers usually can be layers, one on top of another, because one layer can depend on the other layer. Every layer can exist without the layers above it, and can utilize the layers below such layer to function. Data transfer between tiers (e.g., tiered layers) can be part of the architecture. The end-to-end traceability of data flows through n-tier systems can be a challenging task which can become more important when systems increase in complexity. Each tier itself can run as a cluster.

With regard to multi-tier applications, dependencies, and offline and online patching, there can be dependencies between offline and online tiers that can be significant (e.g., important) for patching. When there is a first tier on which offline patching is to be performed during a maintenance time window, and that first tier in turn depends on another tier for which online patching can be performed, it can be desirable (e.g., useful) for the patches being performed offline for the first tier to satisfy the maintenance time window. When there is a first tier that for which online patching is to be performed, and that first tier in turn depends on another tier that for which offline patching is to be performed, the first tier associated with the online patching can essentially be considered as offline (e.g., by the PMC 114) for the duration of the other tier associated with the offline patching. This can allow identifying branches of a dependency tree which can be patched online and can enable patching more services during the maintenance time window for offline patching.

In certain embodiments, the PMC 114 can desirably perform simultaneous or parallel patching of various resources (e.g., containers 104, VMs 106, . . . ), in accordance with the defined patch management criteria. With regard to simultaneous patching of multiple containers 104 and VMs 106 that can use the same PMs 108, it can be desirable to not load the machines (e.g., VMs 106) too much in the cloud when such machines are being used by other applications as well. Accordingly, the PMC 114 can control patching to desirably limit the amount of simultaneous patches being applied to the machines (e.g., VMs 106). If it is assumed that a cloud of the computing system 102 is shared in such a way that no service can use resources from another application, the PMC 114, employing the patch execution component 118, can potentially start patching as many services as can be desired, in accordance with the defined patch management criteria.

Thus, in regard to the disclosed subject matter, the problem of applying patches to a workload can boil down to finding a subset of patches, a part of which can be applied online while other patches are to be applied offline (e.g., by bringing down the application(s)), wherein the total time to apply the patches does not exceed the allowed maintenance time window. With regard to applying a patch, in addition to the actual execution time to perform the patch, as disclosed, the amount of time to apply the patch can include the stop and start time for the application and reboot and restart time for the VM or container. A goal of the PMC 114 can be to prioritize, and the PMC 114 can prioritize, patching higher risk vulnerabilities and more urgent application patches over lower priority or less urgent application patches.

The PMC 114 can manage patching a multi-tier workload having multiple resources deployed across a group of nodes in a hybrid cloud environment, wherein workloads can comprise resources deployed across a mix of nodes (e.g., containers 104, VMs 106, PMs 108, . . . ). The PMC 114 also can enable some of the resources to be patches online (e.g., when it is determined that such patching online can be performed), while patching other desired resources offline, and while ensuring that the services and applications for which patching is desired can be patched while the services and applications, and associated components of the computing system 102, are offline within a maintenance time window. For instance, the PMC 114 can handle (e.g., manage) the workload, comprising the first workload portion for which certain patches are to be applied during the maintenance time window while offline and the second workload portion for which other patches can be applied while online, at the same time or substantially the same time, while prioritizing higher vulnerability risk patches (e.g., patches with a high vulnerability or importance score or level) within the applicable maintenance time window.

In some embodiments, the PMC 114 can monitor the network (e.g., network of the computing system 102) for requests (e.g., requests between resources) to facilitate determining workload dependencies between containers 104, VMs 106, PMs 108, other resources 110 or nodes 112, etc., wherein a workload dependency can be between a first type of item (e.g., container 104) and another type(s) of item(s) (e.g., PM 108) or can be between items of the same type (e.g., a first VM 106 and a second VM 106). A request between resources can indicate (e.g., to the PMC 114) an association between the resources or whether one resource is dependent on the other resource, the type of request or the tiers or relative tiers of the resources (e.g., one resource is in one tier (or layer) and the other resource is in another tier (or layer) below the one tier).

The PMC 114 can determine the workload dependencies between the containers 104, VMs 106, PMs 108, other resources 110 or nodes 112, etc., based at least in part on the monitoring of the network for the requests or through other means of determining such workload dependencies, as described herein. In some embodiments, the PMC 114 can determine or identify the topology of the network, including the dependencies between resources, based at least in part on analyzing the requests. Also, based at least in part on analyzing the requests or through the other means of determining such workload dependencies, the PMC 114 can determine or generate a dependency tree between resources/nodes, wherein the dependency tree for the computing system 102 or portion thereof, can have a shape that can allow the PMC 114 to patch multiple services at the same time. The PMC 114 can leverage the dependency tree to enable including and performing more patches in the given maintenance time window.

The PMC 114 can determine the workload based at least in part on the workload dependencies between the resources. The workload can comprise the first workload portion, which can be workload items (e.g., containers 104, VMs 106, PMs 108, resources 110 or nodes 112, . . . ) that are to be patched by a first subset of patches while offline (e.g., due at least in part to workload dependencies of such workload items) within a maintenance time window, and a second workload portion that can be patched by a second subset of patches while online. The patch identifier component 116 can identify or determine patches that are to be applied to the workload or the relative importance levels (e.g., vulnerability scores) of the patches or information relating thereto.

To facilitate determining which patches to perform for a given maintenance time window, the PMC 114 can determine vulnerability scores at least for a first subset of patches that are desired to be performed on the first workload portion of the workload while offline during the maintenance time window. In some embodiments, the PMC 114 also can determine vulnerability scores for a second subset of patches that can be performed on the second workload portion of the workload while online.

Given the limited amount of time available during the maintenance time window, it often may not be possible to perform all of the patches in the first subset of patches for the first workload portion during the maintenance time window. The PMC 114 can determine the vulnerability scores of the patches of the first subset of patches or the second subset of patches, based at least in part on the importance, priority, vulnerability or risk level of each of the patches in the first subset of patches or second subset of patches. There typically can be some patches that are more important to perform than other patches in the first subset of patches. The PMC 114 can maximize the addressed risk (e.g., risk to the computing system 102 or portion thereof, such as container 104, VM 106, PM 108, other resource 110, node 112, application or data, . . . ) by prioritizing the patches to perform the more important patches of the first subset of patches that are able to be performed during the maintenance time window, and can select the more important patches to be performed during the maintenance time window (e.g., to be in a third subset of patches to be performed).

The vulnerability scores can indicate variations in importance of patches. For instance, the PMC 114 can employ a vulnerability scoring scale (e.g., a point scale) that can inform as to how serious each issue is with respect to each of the patches, which can allow the PMC 114 to judge or determine the severity of the issue for each patch and determine what the most important patches are. The vulnerability scoring scale can take into account the potential risk based on a technical analysis of the exact flaw and its type (or a current threat level, although the current threat level may be omitted from such analysis). Common vulnerability scoring system (CVSS) base scores can provide additional guidance about a vulnerability, giving a detailed severity rating by scoring the constant aspects of a vulnerability: e.g., access vector, access complexity, authentication, confidentiality, integrity, and availability. In some embodiments, the PMC 114 can employ a vulnerability scoring scale of 1 to 3, with 1 representing the most important patching and 3 representing the least important patching. For instance, a 1 value or score can indicate that the vulnerability associated with a patch is high level, and such patch is higher priority, a 2 value or score can indicate that the vulnerability associated with a patch is medium level, and such patch is a relative medium priority, and a 3 value or score can indicate that the vulnerability associated with a patch is low level, and such patch is a relative lower priority. It is to be appreciated and understood that, in various other embodiments, the PMC 114 can employ other vulnerability, importance or risk scoring scales, such as, for example, a scale of 1 to 5 (or 10 or 100), with 5 (or 10 or 100) representing the most important patching and 1 representing least important patching or vice versa.

In certain embodiments, the PMC 114 can determine or assign group vulnerability scores to groups of patches, based at least in part on the individual vulnerability scores of the individual patches (for each group of patches) using a desired patch management algorithm, such as more fully described herein. For example, in accordance with one patch management algorithm that can be applied, the PMC 114 can determine (e.g., calculate) group vulnerability scores for groups of patches (e.g., different groupings of patches) associated with the first workload portion or second workload portion based at least in part on the individual vulnerability scores of the individual patches (for each group of patches) by applying a formula based on the sum of geometric series to the individual vulnerability scores, as more fully described herein. The PMC 114 can use such formula to facilitate ensuring that a large number of patches having low vulnerability scores do not end up having a higher group vulnerability score than a relatively small number of patches having high vulnerability scores in order to place a higher priority on patches that have higher vulnerability scores.

After evaluating the vulnerability scores of the patches, the PMC 114 can determine a third subset of patches that can be applied to a portion (e.g., a subset of containers 104, VMs 106, PMs 108, resources 110 or nodes 112, . . . ) of the first workload portion from the first subset of patches associated with the first workload portion, based at least in part on the vulnerability scores of the patches of the first subset of patches or the second subset of patches, and the maintenance time window. For instance, the PMC 114 can determine which group of patches associated with the first workload portion or second workload portion has the highest group vulnerability score as compared to the group vulnerability scores of other groups of patches associated with the first workload portion or second workload portion, in accordance with the desired patch management algorithm (e.g., using the formula or other desired patch management algorithm). The PMC 114 can select the group of patches that has the highest group vulnerability score for patching, wherein the group of patches can comprise the third subset of patches, which can be applied to the portion of the first workload portion while offline, during the maintenance time window or the second subset of patches which can be applied to the second workload portion while online.

The patch execution component 118 can perform (e.g., apply) the third subset of patches on (or to) the portion of the first workload portion during the maintenance time window. In some embodiments, the patch execution component 118 can perform the patches of the third subset of patches in topological order, in accordance with the topology of the network, as determined by the PMC 114. In certain embodiments, the patch execution component 118 can perform patches of the third subset of patches simultaneously (e.g., in parallel) on multiple workload items (e.g., containers 104, VMs 106, PMs 108, other resources 110, nodes 112, applications or data, . . . ), including workload items with dependencies, of the portion of the first workload portion within the available maintenance time window.

The PMC 114, including the patch execution component 118, can perform the patching process to facilitate performing the third subset of patches, wherein the patching process can comprise stopping and restarting resources associated with the portion of the first workload portion and rebooting nodes associated with the third subset of patches, as more fully described herein. With regard to containers 104 to be patched, the patch execution component 118 can apply patches to container images of containers 104, as immutable container instances typically are not patched. With regard to VMs 106 and PMs 108, the patch execution component 118 typically can apply patches to the VM or PM instances of the VMs 106 or PMs 108, and not necessarily the VM or PM images of the VMs 106 or PMs 108.

The patch execution component 118 also can perform the second subset of patches on the second workload portion, wherein the second subset of patches can be performed while the second workload portion (or other portion of the computing system 102) is online or can be performed outside the maintenance time window or during the maintenance time window. In certain embodiments, the patch execution component 118 can perform all or at least a portion of the patches of the second subset of patches on the second workload portion simultaneously (e.g., in parallel) with a portion of the patches of the third subset of patches being performed on the portion of the first workload portion during the maintenance time window.

In some embodiments, the PMC 114, including the patch execution component 118, can apply patches (e.g., second and third subsets of patches) as follows. The patch execution component 118 can initiate live patching (e.g., in background) to apply patches with regard to the second workload portion (e.g., containers 104 (e.g., pods), VMs 106, PMs 108, other resources 110, nodes, . . . ), for example, for associated services, that can be patched live (e.g., online). With regard to patching associated with the portion of the first workload portion that is being performed offline, for a subset of pods and a subset of patches for each VM 106 of the portion of the first workload portion, the patch execution component 118 can initiate patching on the pods (e.g., containers 104) and VMs 106 which do not have any dependency and can patch (e.g., update) such pods and VMs in parallel. Whenever a pod or VM is patched, the PMC 114 can update the list of pods and VMs which can be patched and can initiate patching on the pods and VMs on the list of pods and VMs. The PMC 114, including the patch execution component 118, can continue this disclosed process until all of the desired (e.g., selected) services have been patched.

After performing the patches, the PMC 114 can validate the patching of the portion of the first workload portion or the second workload portion within the maintenance time window to facilitate ensuring that the patches were applied properly, and ensuring that the patches and the respective items of the portion of the first workload portion or the second workload portion, and the computing system overall, are performing properly after such patches have been applied. For example, after one or more patches has been applied, the PMC 114 can analyze or examine an application(s), node(s), or resource(s), etc., associated with or affected by the one or more of the patches to determine whether the application(s), node(s), or resource(s), etc., satisfies defined patch management criteria that indicates the application(s), node(s), or resource(s), etc., is in a defined healthy or usable operational state (e.g., the application(s), node(s), or resource(s), etc., is operating properly, suitably, acceptably, or optimally, or at least is operating sufficiently well to meet or exceed defined minimum operational standards). If the PMC 114 determines that the application(s), node(s), or resource(s), etc., satisfies such defined patch management criteria after the one or more patches have been applied, the PMC 114 can determine that the one or more patches are validated. If the PMC 114 determines that a particular patch is validated, the PMC 114 can maintain the particular patch. However, in response to determining that a particular patch and associated workload item(s) is not able to be validated, the PMC 114 can revert the particular patch associated with the workload item(s), within the maintenance time window, to return the workload item(s) to its previous state prior to the particular patch being applied.

With regard to the other patches (e.g., unapplied patches) of the first subset of patches, which were not selected by the PMC 114 to be performed during the maintenance time window, the PMC 114 can defer performing such other patches on the other portion of the first workload portion to a next or future maintenance time window, in accordance with the defined patch management criteria. The PMC 114 can determine or calculate a next maintenance time window during which the patch execution component 118 can apply the other patches of the first subset of patches (or other patches, if any, that can subsequently be available or discovered).

Figure 2:
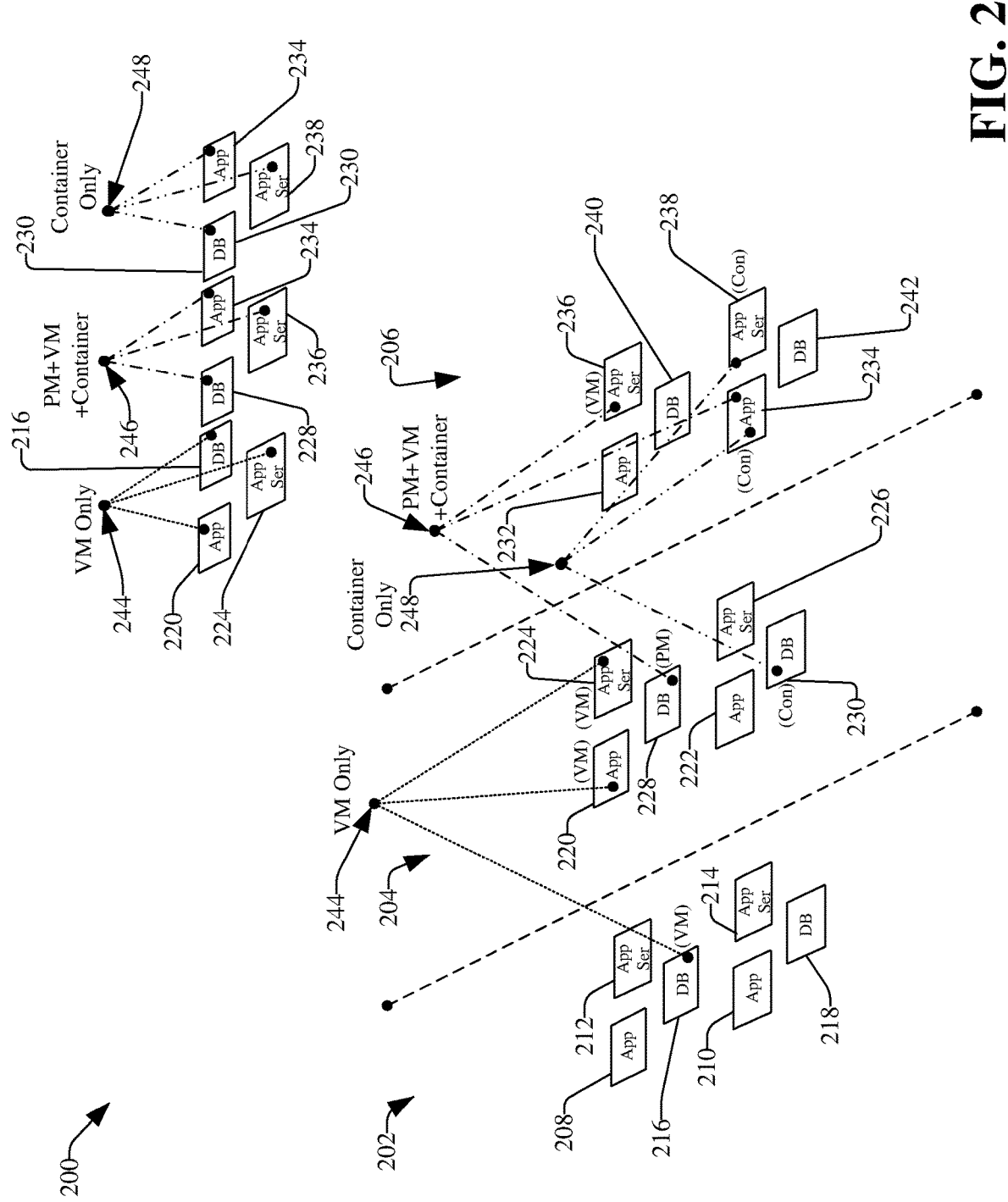
FIG. 2 depicts a diagram of an example, non-limiting computing system comprising workloads that can span multiple dimensions, in accordance with various aspects and embodiments of the disclosed subject matter.

Referring to FIG. 2 (along with FIG. 1), FIG. 2 depicts a diagram of an example, non-limiting computing system 200 comprising workloads that can span multiple dimensions, in accordance with various aspects and embodiments of the disclosed subject matter. The computing system 200 (e.g., a hybrid cloud-based computing platform) can comprise a traditional IT platform 202, a private cloud computing platform 204, and a public cloud computing platform 206, and can thereby span multiple dimensions with regard to computing platforms. The traditional IT platform 202 can comprise, for example, applications (app), including applications 208 and 210, application servers (app ser), including application servers 212 and 214, and databases (DB), including databases 216 and 218. The private cloud computing platform 204 can comprise, for example, applications, including applications 220 and 222, application servers, including application servers 224 and 226, and databases, including databases 228 and 230. The public cloud computing platform 206 can comprise, for example, applications, including applications 232 and 234, application servers, including application servers 236 and 238, and databases, including databases 240 and 242.

In some embodiments, the computing clouds (e.g., 204, 206) can be associated with different vendors (e.g., first vendor, second vendor, or third vendor, . . . ), and thus can span across multiple dimensions with regard to vendors and types of vendors (e.g., types of services provided by vendors). The computing system 200 also can employ multiple hypervisor technologies, such as, for example, a bare-metal hypervisor technology, a kernel-based VM (KVM) (e.g., kernel-based hypervisor technology), a microkernel-based hypervisor technology, containers, or unikernels, etc., that can provide various computing services, and thus can span across multiple dimensions with regard to types of hypervisor technologies.

The workloads also can span across multiple dimensions, for example, with regard to computing platforms (e.g., traditional IT platform 202, a private cloud computing platform 204 or a public cloud computing platform 206), computing or cloud service vendors, hypervisor technologies, types of resources (e.g., VM, container, PM, nodes or other resources), wherein each workload can have its own dependencies between resources of the workload (e.g., dependencies between nodes of multiple tiers of the workload) (or no dependency). For example, the example computing system can comprise a first workload 244, a second workload 246, and a third workload 248. The first workload 244 can comprise a VM(s) (e.g., VM only) that can span across the traditional IT platform 202 and private cloud computing platform 204, wherein the VM(s) of the first workload 244 can be implemented by or associated with the database 216 of the traditional IT platform 202 and the application 220 and the application server 224 of the private cloud computing platform 204, wherein the database 216, application 220, and application server 224 can be implemented as VMs or in VM form.

The second workload 246 can comprise a VM, PM, and container, and can span across the private cloud computing platform 204 and the public cloud computing platform 206. For instance, the VM of the second workload 246 can be implemented by or associated with the application server 236 (e.g., implemented as a VM) of the public cloud computing platform 206, the database 228 (e.g., implemented as a PM) of the private cloud computing platform 204, and the application 234 (e.g., implemented as a container (Con)) of the public cloud computing platform 206.

The third workload 248 can comprise a container(s) (e.g., container only), and can span across the private cloud computing platform 204 and the public cloud computing platform 206. For instance, the container(s) of the third workload 248 can be implemented by or associated with the database 230 of the private cloud computing platform 204, and the application 234 and the application server 238 of the public cloud computing platform 206, wherein the database 230, application 234, and application server 238 can be implemented as containers or in container form. It is to be appreciated and understood that these workloads (e.g., 244, 246, 248) are just example workloads, and, in accordance with various embodiments, the disclosed subject matter can comprise, relate to or involve various different types of workloads in addition to or as an alternative to, these example workloads and other workloads described herein.

The first workload 244, second workload 246, and third workload 248 can provide examples of dependencies between resources with regard to offline patching (e.g., by the PMC 114 and patch execution component 118), wherein the resources can be distributed across one or more nodes, such as illustrated in FIG. 2 (and as otherwise illustrated in the drawings or described herein). The PMC 114 can determine or identify the dependencies between resources of the workload (e.g., dependencies between nodes of multiple tiers of the workload) associated with the workloads (e.g., 244, 246, 248, . . . ) to facilitate determining which patches are to be performed on certain workloads during a particular maintenance time window (e.g., which patches are to be prioritized and performed with regard to the particular maintenance time window over other patches), including determining which resources are able to be stopped and started without breaking or interfering with a particular workload, in accordance with the defined patch management criteria (e.g., and associated patch management algorithm), as more fully described herein.

Figure 3:
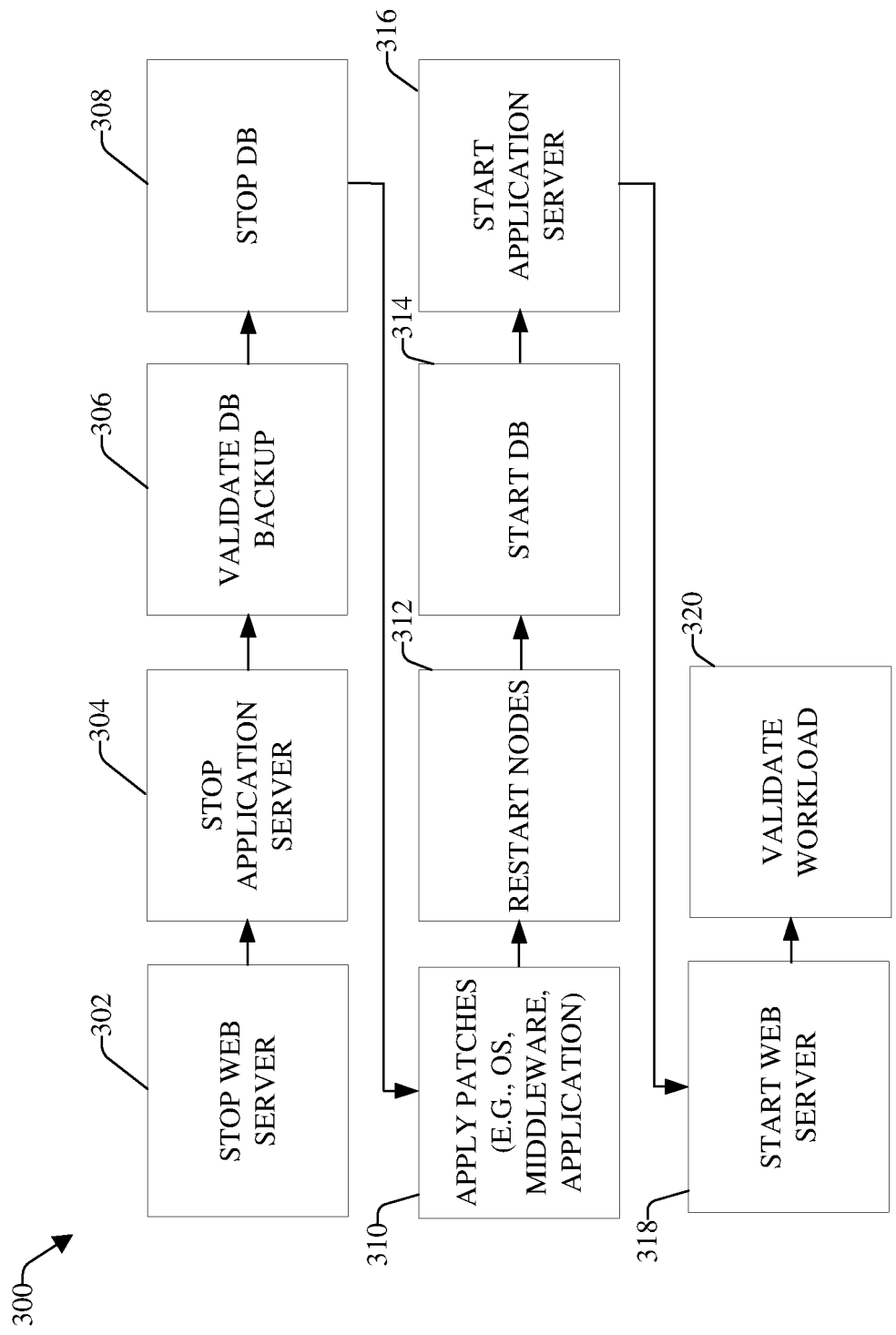
FIG. 3 presents a block diagram of an example patching sequence for applying patches during a maintenance time window while the workload associated with the patches is offline, in accordance with various aspects and embodiments of the disclosed subject matter.

Referring to FIG. 3 (along with FIG. 1), FIG. 3 presents a block diagram of an example patching sequence 300 for applying patches during a maintenance time window while the workload associated with the patches is offline, in accordance with various aspects and embodiments of the disclosed subject matter. The example patching sequence 300 can relate to an example workload. It is to be appreciated and understood that the example patching sequence 300 is but one example patching sequence that can relate to the example workload, and, in accordance with various embodiments, other patching sequences can be performed (e.g., by the PMC) with respect to other workloads, in accordance with the defined patch management criteria and associated patch management algorithm, as described herein.

When performing the patches on the example workload associated with the patching sequence 300 during the maintenance time window, the example patching sequence 300 can comprise stopping (e.g., ceasing or suspending operation of) a web server associated with the workload upon which patches are to be performed during the maintenance time window, as indicated by reference numeral 302 of the patching sequence 300. For instance, the PMC 114 can stop the web server during the maintenance time window. At reference numeral 304 of the patching sequence 300, the PMC 114 can stop (e.g., cease or suspend operation of) an application server associated with the workload. At reference numeral 306, the PMC 114 can validate a database backup of a database associated with the workload (e.g., can validate or verify that the database has been backed up to preserve the data that is stored in the database). For example, the data stored in the database can be stored in one or more data stores to facilitate backing up the data stored in the database. At reference numeral 308, the PMC 114 can stop the database.

At reference numeral 310 of the patching sequence 300, the patch execution component 118 can apply the patches to the workload, wherein the patches can be to the operating system, middleware or application associated with the workload. At reference numeral 312, the PMC 114 can restart (e.g., reboot or resume operation of) the nodes associated with the workload (e.g., the nodes upon which the patches are applied). At reference numeral 314, the PMC 114 can start the database. At reference numeral 316, the PMC 114 can start (e.g., resume operation of) the application server. At reference numeral 318, the PMC 114 can start the web server.

At reference numeral 320 of the patching sequence 300, the PMC 114 can validate the workload. For instance, during the maintenance time window, while the resources associated with the workload are offline, the PMC 114 can validate the workload and associated patches that were performed on the workload to validate or verify that the resources associated with the workload and the associated patches are performing appropriately subsequent to the patches being performed (e.g., web server performing appropriately, application server performing appropriately, database performing appropriately, including data being restored to the database, and nodes performing appropriately). During the validation process, if the PMC 114 determines that a particular patch(es) or associated workload item(s) or resource(s) (e.g., node, web server, application server, database, . . . ) are not performing properly or acceptably, after the patch has been performed, the PMC 114 can revert (e.g., undo) the patch(es), during the maintenance time window, to return the workload item(s) or resource(s) back to a previous state before the patch(es) was performed, such as more fully described herein. A patch that is not able to be validated can be re-performed at a future time, for example, after the patch has been modified to perform in a desirable (e.g., acceptable, suitable, improved or optimal) manner, in accordance with the defined patch management criteria and associated patch management algorithm.

Figure 4:
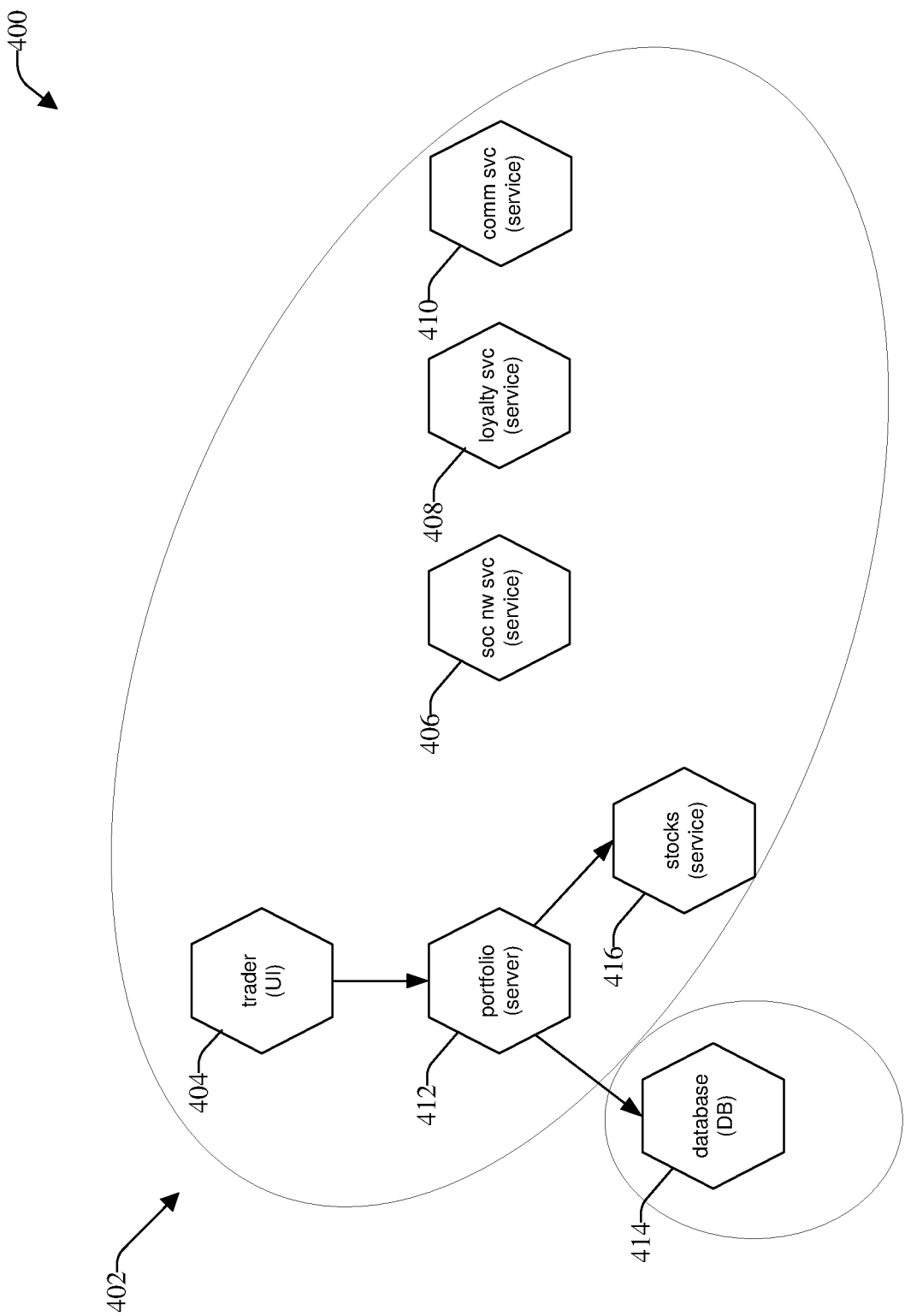
FIG. 4 illustrates a diagram of example application topology in connection with determining dependencies between resources of a workload and patch management, in accordance with various aspects and embodiments of the disclosed subject matter.

Referring to FIG. 4 (along with FIG. 1), FIG. 4 illustrates a diagram of example application topology 400 in connection with determining dependencies between resources of a workload and patch management, in accordance with various aspects and embodiments of the disclosed subject matter. A cloud computing system 402 can comprise various resources and nodes that can be arranged in relation to each other or associated with each other, as desired, to form the cloud computing system 402, which can provide various desired services and applications.

In the cloud computing system 402, the example application topology 400 can comprise a trader container 404 that can be associated with a trader application, a social networking service (soc nw svc) container replica 406 that can be associated with a social networking application, a consumer loyalty service (loyalty svc) container replica 408 that can be associated with a consumer loyalty service application, and a communication service (comm svc) container 410 that can be associated with a communication service application.

The trader container 404 can be or can comprise a user interface (UI), for example, and can be located in a first tier (e.g., top or highest tier) of the application topology 400. The trader container 404 can be associated with (e.g., communicatively or operatively connected to) a portfolio container 412, which can be located in a second tier of the application topology 400, wherein the portfolio container 412 can be or can comprise a server. The portfolio container 412 can be associated with a database VM 414, which can be located in a third tier of the application topology 400 below the portfolio container 412 and trader container 404 in the application topology 400, wherein the database VM 414 can be or can comprise a database or a database application or service. The portfolio container 412 also can be associated with a stocks container 416, which can be located in the third tier of the application topology 400 below the portfolio container 412 and trader container 404 in the application topology 400, wherein the stocks container 416 can be or can comprise a service (e.g., a service relating to stocks, such as stock trading).

The PMC 114 can analyze the network, resources or nodes or requests between resources, and based at least in part on the analysis, can identify or determine dependencies between the containers 104, VMs 106, PMs 108, other resources 110 or nodes 112, etc. For instance, the PMC 114 can monitor the network for requests, can analyze such requests, and can determine or infer dependencies between the containers 104, VMs 106, PMs 108, other resources 110 or nodes 112, etc., based at least in part on the results of the analysis. For example, with regard to the example application topology 400, the PMC 114 can determine the dependencies between the trader container 404, the portfolio container 412, the database VM 414, and the stocks container 416, including determining that the trader container 404 is in the first tier, the portfolio container 412 is in the second tier, and the database VM 414 and the stocks container 416 are in the third tier in relation to each other.

Figure 5:
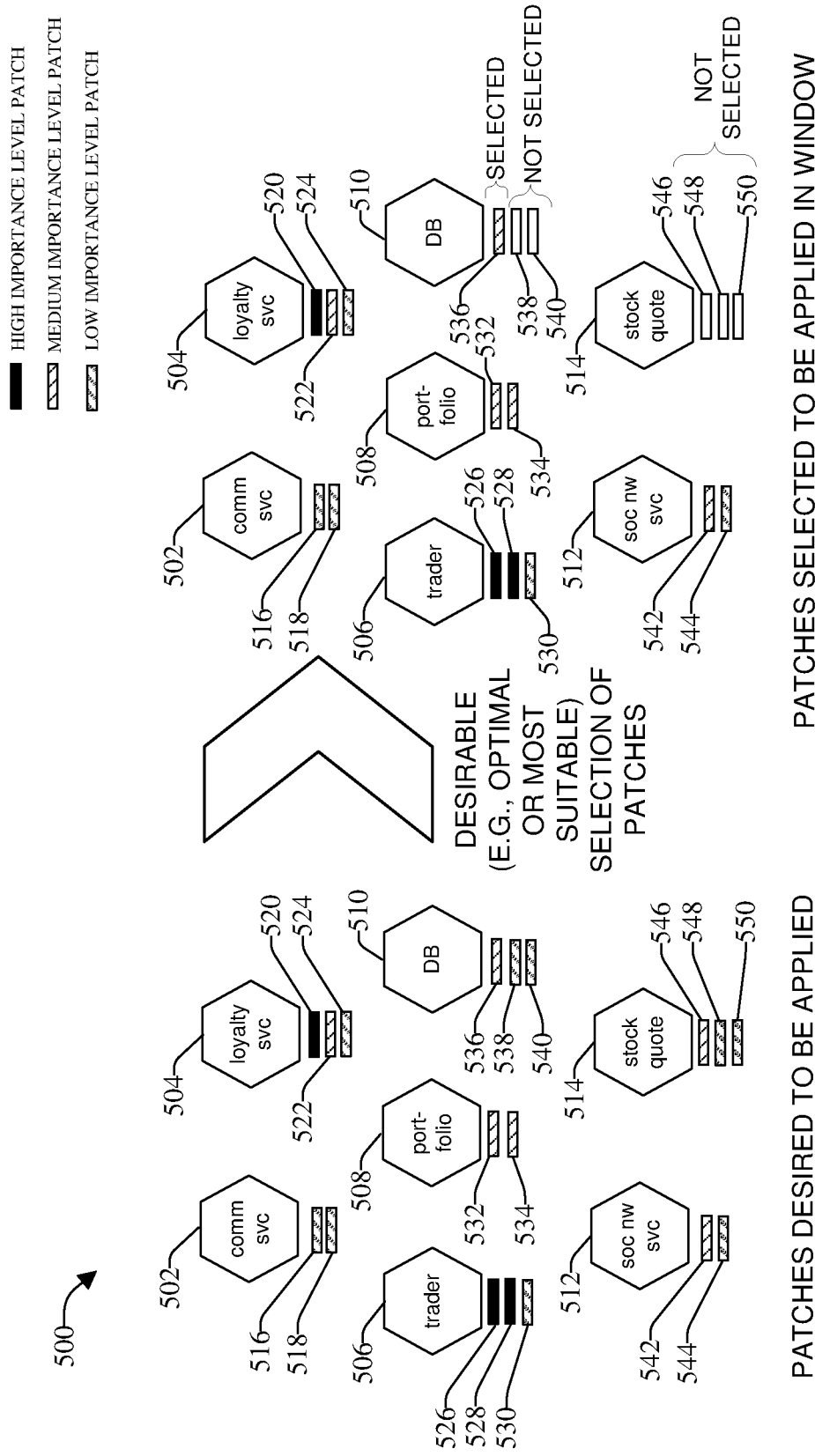
FIG. 5 depicts a diagram of example patch selection with regard to an example workload associated with a computing system in connection with dependencies between resources of the workload and patch management, in accordance with various aspects and embodiments of the disclosed subject matter.

Turning to FIG. 5 (along with FIG. 1), FIG. 5 depicts a diagram of example patch selection 500 with regard to an example workload associated with a computing system in connection with dependencies between resources of the workload and patch management, in accordance with various aspects and embodiments of the disclosed subject matter. With regard to the example patch selection 500, the PMC 114 can determine the patches to be selected to be performed, including a subset of the patches, which can be associated with a first workload portion of the workload, to be applied (e.g., by the patch execution component 118) within a maintenance time window while resources, nodes, etc., associated with the first workload portion of the workload are offline, taking into account dependencies between resources of the workload (e.g., dependencies between nodes of multiple tiers of the workload), the relative importance, priority or vulnerability of the workload items and associated patches to be performed or other factors, in accordance with the defined patch management criteria and associated patch management algorithm, as more fully described herein. The PMC 114 also can determine another subset of patches associated with a second workload portion of the workload that can be applied (e.g., by the patch execution component 118) while the resources, nodes, etc., associated with the second workload portion are online (e.g., live), wherein the other subset of patches or at least a portion of the other subset of patches, associated with the second workload portion can be applied within the maintenance time window (e.g., simultaneously or in parallel with performing the patches associated with the first workload portion).

The PMC 114 can prioritize applying higher vulnerability patches (e.g., more urgent application patches) within a given maintenance time window, in accordance with the defined patch management criteria and associated patch management algorithm, as more fully described herein. For instance, the PMC 114 can handle (e.g., manage) patching of the workload, comprising at least a portion of the first workload portion for which certain patches are to be applied during the maintenance time window while offline and the second workload portion for which other patches can be applied while online (e.g., at the same time or substantially the same time), to prioritize higher vulnerability patches (e.g., patches with a high vulnerability or importance score or level) within the given maintenance time window.

With respect to the example patch selection 500, there can be a workload associated with a variety of applications upon which it can be desired to perform patches within a maintenance time window (e.g., an applicable downtime window) when the first workload portion of the workload (e.g., the applications or associated resources, nodes, etc.) is offline and the second workload portion is online. The applications can comprise, for example, a communication service (comm svc) application 502, a consumer loyalty service (loyalty svc) application 504, a trader application 506, a portfolio application 508, a database application 510, a social networking service (soc nw svc) application 512, and a stock quote application 514.

With respect to the applications (e.g., 502, 504, 506, 508, 510, 512, 514), based at least in part on the results of analyzing the dependencies between resources associated with the applications and the patches associated with the workload, the PMC 114 can determine or identify various patches for which it can be desired that such patches be performed (e.g., applied), can determine which of those patches are to be applied to the resources (e.g., containers 104, VMs 106, PMs 108, other resources 110), nodes (e.g., nodes 112), etc., associated with the first workload portion within the maintenance time window while the first workload portion is offline, and can determine which of those patches can be applied to the resources, nodes, etc., while the second workload portion is online. With regard to the portion of the patches that are associated with the first workload portion and are to be performed during the maintenance time window while the resources, nodes, etc., associated with the first workload portion are offline, the PMC 114 can determine the relative (e.g., different) importance, priority or vulnerability (e.g., high level, medium level or low level) of the patches for which it can be desired that such patches be performed, within the maintenance time window. However, as often can be the case, there can be more patches to be applied than can be applied within the maintenance time window. For instance, the PMC 114 can determine or identify patches 516 and 518 that are to be performed with respect to the communication service application 502, and further can determine that patches 516 and 518 are low level patches (e.g., patches 516 and 518 each have vulnerability scores that indicate they have a relatively low level of importance, priority or vulnerability). The PMC 114 also can determine or identify patches 520, 522, and 524 that are to be performed with respect to the consumer loyalty service application 504, and further can determine that patch 520 is a high level patch (e.g., patch 520 has a vulnerability score that indicates is has a high level of importance, priority or vulnerability), patch 522 is a medium level patch (e.g., patch 522 has a vulnerability score that indicates is has a medium level of importance, priority or vulnerability), and patch 524 is a low level patch (e.g., patch 524 has a vulnerability score that indicates is has a relatively low level of importance, priority or vulnerability).

The PMC 114 further can determine or identify patches 526, 528, and 530 that are to be performed with respect to the trader application 506, and further can determine that patches 526 and 528 are high level patches, and patch 530 is a low level patch. Furthermore, the PMC 114 can determine or identify patches 532 and 534 that are to be performed with respect to the portfolio application 508, and further can determine that patches 532 and 534 are medium level patches. The PMC 114 also can determine or identify patches 536, 538, and 540 that are to be performed with respect to the database application 510, and further can determine that patch 536 is a medium level patch and patches 538 and 540 are low level patches.

The PMC 114 further can determine or identify patches 542 and 544 that are to be performed with respect to the social networking service application 512, and also can determine that patch 542 is a medium level patch and patch 544 is a low level patch. The PMC 114 further can determine or identify patches 546, 548, and 550 that are to be performed with respect to the stock quote application 514, and also can determine that patch 546 is a medium level patch and patches 548 and 550 are low level patches.

The PMC 114 can analyze the patches (e.g., patches 516 through 550), determine and analyze dependencies between the resources associated with the workload, determine which patches (e.g., subset of patches) are to be performed while the first workload portion is offline, determine which patches (e.g., other subset of patches) can be performed while the second workload portion is online, determine vulnerability scores of the patches or group vulnerability scores of various groups (e.g., groupings) of the patches, and determine a desired (e.g., optimal, suitable or acceptable) subset of patches that can be performed within the maintenance time window and has an overall vulnerability score that is higher (e.g., highest) than other overall vulnerability scores of other subsets of the patches, in accordance with the defined patch management criteria and associated patch management algorithm. Such desired subset of patches, by having the highest overall vulnerability score (e.g., maximizing the vulnerability score), can minimize or at least significantly reduce, the vulnerabilities to the computing system.

In the example patch selection 500, based at least in part on the analysis results, the PMC 114 can determine, for example, that patches 516 and 518, which can be low level patches associated with the communication service application 502, and patches 542 and 544, which, respectively, can be a medium level patch and a low level patch, associated with the social networking service application 512 can be associated with the second workload portion and can be applied while the second workload portion is online (e.g., applied within the maintenance time window or outside the maintenance time window). Also, based at least in part on the analysis results, the PMC 114 can determine the desired subset of the patches (e.g., having highest overall vulnerability score; able to be performed within the maintenance time window) can include patches 520, 522, 524, 526, 528, 530, 532, 534, and 536, but does not include patches 538, 540, 546, 548, and 550. The patch execution component 118 can apply the subset of patches (e.g., patches 520 through 536) associated with the first workload portion, within the maintenance time window, while the first workload portion is offline, and can apply the other subset of patches (e.g., patches 516, 518, 542, and 544) associated with the second workload portion, within the maintenance time window, while the second workload portion is online, as more fully described herein.

With further regard to FIG. 1, there are a number of patch management algorithms that the PMC 114 can utilize or apply to determine which patches are to be performed during a maintenance time window. In accordance with one patch management algorithm, the PMC 114 can treat each patch of a VM as a single entry, wherein, for example, priority can be given to patches with a high vulnerability score if all patches cannot be applied during the maintenance time window; can treat all patches for each container (e.g., pod) as a single entry, wherein the amount of time to apply such patches and the start and stop time for all resources in a pod can be combined together because container images are patched offline.

As an example of the amount of time to stop and start a resource, to patch a particular application server on a VM (e.g., VM 106), it can take approximately two minutes to stop the application server, approximately one minute to apply the patch, and approximately four minutes to start the application server after applying the patch. If there are multiple patches for an application server resource, the PMC 114 can combine these patches together into a single entry so that the application server does not have to be stopped and restarted multiple times to apply these patches. If the application server patches are considered separately, the amount of time can be overcommitted (e.g., can exceed the amount of time available in the maintenance time window) by including the restarts multiple times. It is noted that the restart time for that VM can be included as a separate entry with 0 time to make the patch.

In accordance with such patch management algorithm, each patch can comprise the following attributes: the amount of time to stop the container 104, VM 106, PM 108 or other resource 110; the amount of time to restart the container 104, VM 106, PM 108 or other resource 110; the amount of time to apply the patch (which can be zero for containers 104); the importance score (e.g., importance or vulnerability score) for the patch; a replicas count associated with the patch; and the kind of patch. In some embodiments, when determining (e.g., calculating) the importance or vulnerability score of patches, the PMC 114 can calculate the importance or vulnerability score using a geometric series sum for containers.

The following can be an illustrative non-limiting example of determining (e.g., calculating) an importance score for a pod using a formula based on a sum of geometric series. To facilitate determining (e.g., calculating) the importance or vulnerability score for updates for a pod, with respect to each type of update (e.g., high importance, medium importance, or low importance), the PMC 114 can determine an importance or vulnerability score (e.g., individual important or vulnerability score) for that type of update using the following example equation:

$$\sum_{i=2}^{nx+1}(1/x)^i$$

wherein x can be the type of update with importance value (2=high, 3=medium, 4=low) and nx can be the number of updates of the particular type that are to be applied to the pod. The PMC 114 can determine the total (e.g., overall or group) importance or vulnerability score for all of the updates for the pod by adding together the individual importance or vulnerability scores determined for the different types of updates for the pod. For example, a pod can have two high importance updates (e.g., patches) with x=2 and four medium updates with x=3. The PMC 114 can determine the importance or vulnerability score for the high importance updates as $[(1/2)^2+(1/2)^3]$; can determine the importance or vulnerability score the medium importance updates as $[(1/3)^2+(1/3)^3+(1/3)^4+(1/3)^5]$; and can determine the total importance or vulnerability score for the updates for the pod as $[(1/2)^2+(1/2)^3]+[(1/3)^2+(1/3)^3+(1/3)^4+(1/3)^5]$. When determining a score for, and how to determine a score for, a container or pod, it can be desirable to not have the sum of too many of the lower importance updates (e.g., lower vulnerability updates or patches) overwhelm the sum of high importance updates. This patch management algorithm (as well as other patch management algorithms disclosed herein) can enable the high importance updates (e.g., the sum of high importance updates) to not be overwhelmed by the lower importance updates (e.g., the sum of a relatively larger number of lower importance updates).

In some embodiments, the PMC 114 can apply another patch management algorithm to facilitate determining a desirable (e.g., suitable, optimal or at least virtually optimal) subset of patches to perform with respect to a workload within a maintenance time window, in accordance with the defined patch management criteria. Such patch management algorithm can provide a dynamic programming solution for determining a desirable subset of patches to apply and can be expressed as follows, for example.

The PMC 114 can create an empty two-dimensional array K[(N+1)][(W+1)], wherein N can be the total number of updates (e.g., patches) and W can be the size of the window (e.g., maintenance time window) in which the services can be rebooted. The PMC 114 can initialize this array, wherein for each location, K[i][j] of this array can hold the following entries: given i updates and window size j, a map that can contain a subset of updates [1:i] and the estimated completion times of the updates, which can give a maximum accumulated score for the window size j; a maximum accumulated score achievable in the window size j; and a thread map that can contain a distribution of updates across multiple threads to achieve this maximum accumulated score, wherein the thread map can have a special thread referred to as "live" (e.g., for updates that can be performed online) as well. The solution can be the entry at the K[(N+1)][(W+1)] location.

With regard to filling up K and determining K[(N+1)][(W+1)], at each K[i][j] of the array, the PMC 114 can assign the initial maximum score to the score of K[i−1][j]; can initialize the best subset of pods to be equal to the subset at K[i−1][j] and the thread map equal to that of K[i−1][j]; can check if an update i can be added to the subset of updates located at K[i−1][l], wherein 1:0−j without exceeding the window size j; if the update i can be added to the subset of updates, can add the scores of all of the new pods/containers added to K[i−1][l] and compare it with the previous maximum score; if the score obtained from adding the scores of all of the new pods/containers to K[i−1][l] is greater than the previous maximum score, can update the three entries; and can continue to perform the above operations until the PMC 114 has tried all 1:0−j. The PMC 114 can identify or determine the subset of patches associated with the maximum score (e.g., maximum or highest vulnerability score).

With further regard to checking to determine whether an update i can be added to the subset of updates, the PMC 114 can obtain or determine a list of all of the dependencies of the current pod/container (e.g., dependencies between nodes of multiple tiers of the workload). The PMC 114 can check (e.g., analyze, evaluate) to determine whether all of the dependencies of the current pod/container can be patched live (e.g., online). If all of the dependencies of the current pod/container can be patched live, the PMC 114 can add them to the live thread and update the score (e.g., vulnerability score). If the current pod/container cannot be patched live, but some of the dependencies can be patched live, the PMC 114 can remove the dependencies from the live thread and can treat such dependencies as new dependencies which cannot be patched live. With regard to each dependency, if the time when the previous dependency is not there in the thread, the PMC 114 can add the time when the previous dependency ends to the thread, which can complete dependency earliest after the previous dependency ends (e.g., in accordance with Greedy scheduling), check if the completion time does not exceed j; and add the score of current dependency to the total score.

In certain embodiments, the PMC 114 can determine a desirable (e.g., the most important) subset of patches by enumerating all the possible subsets of the patches, filtering feasible subsets from this list, and determining the feasible subset of patches with the highest accumulated score, in accordance with the defined patch management criteria. For a total number of pending patches m, the number of subsets can be $2^m$.

In certain embodiments, the PMC 114 can apply a patch management algorithm (e.g., Algorithm 1—getOptimalSubset, as disclosed herein) to facilitate determining a desirable (e.g., suitable or optimal) subset of patches to perform with respect to a workload within a maintenance time window, in accordance with the defined patch management criteria. Definitions of variables and functions used in this patch management algorithm (e.g., Algorithm 1) can comprise the following: W can be the size of the offline window; [p1, p2, p3, . . . pm] can be the list of pending patches, wherein the total number of pending patches is m; [(depsDict)] can be the dependency tree of the application (adjacency list); K can be a 2-dimensional array that can hold the solution to sub-problems; scheduleCrit can schedule the given list of patches by scheduling longest critical path first; scheduleGreedy can schedule the given list of patches in a first come, first server manner, greedily; and schedPolicy can be the scheduling policy, it can be either greedy or critical.

The patch management algorithm can be expressed as follows:

$$\max_{P_{opt}, ThMap} score(P) \quad (1)$$

$$s.t. \; P_{opt} \in \mathcal{P}(P)$$

$$\forall \, p \in P_{opt}, endTime(p) <= W$$

$$\forall \, p \in P_{opt}, \forall \, dep \in deps(p), startTime(p) > endTime(dep)$$

$$\forall \, p \in P_{opt}, deps(p) \subseteq P_{opt}$$

$$\forall \, Th \in ThMap, \forall \, p1 \in Th, \forall \, p2 \in Th,$$

$$\neg \, (startTime(p1) >$$

$$startTime(p2) \; and \; startTime(p1) < endTime(p2))$$

where $P \leftarrow$ Set of all pending patches $P_{opt} \leftarrow$ Feasible subset with maximum score $W \leftarrow$ Size of the offline window $ThMap \leftarrow$ Schedule of patches on given number of threads

| Algorithm 1 getOptimalSubset |
|---|
| 1: procedure GETOPTIMALSUBSET)W, [p1,p2, . . . pm]. [(depsDict)].schedPolicy) |
| 2: K ← [[(0,[( )])$_{0,0}$,(0,[( )]$_{0,1}$, . . . , (0[( )])$_{0,m}$], . . . ,[(0,[()]$_{W,0}$, . . . ,(0,[()])$_{W,m}$]] |
| 3: for i ← 0: m do |
| 4: for w ← 0: W do |
| 5: if i == 0 or w == 0 then |
| 6: continue |
| 7: maxScore ← K[i − 1][w][0] |
| 8: maxDepMap ← K[i − 1][w][1] |
| 9: maxThMap ← K[i − 1][w][2] |
| 10: for $p_w$ ← 0 : w do |
| 11: if schedPolicy == 'Critical' then |
| 12: scr, thMap ← scheduleCrit(w, K[i − 1][$p_w$]) |
| 13: else |
| 14: scr, thMap ← scheduleGreedy(w, K[i − 1][$p_w$]) |
| 15: if scr > maxScore then |
| 16: maxScore ← scr |
| 17: maxDepMap ← K[i − 1][w][1] |
| 18: maxThMap ← K[i − 1][w][2] |
| 19: K[i][w] ← [maxScore,maxDepMap,maxThMap] |
| return K[i][w] |

This patch management algorithm (e.g., Algorithm 1—getOptimalSubset) can model patch selection as knapsack in such a way that time to patch can be considered the weight of the patch, the score of the patch can be the value of the patch, and the total offline window size can be treated as the size of the sack. This patch management algorithm (e.g., as implemented by the PMC 114) can determine the subset of patches that ensures patching of maximal important patches within W minutes. This patch management algorithm (e.g., as implemented by the PMC 114) can assign an importance score with each patch with the goal to determine a feasible subset of patches that maximizes the accumulated score. The patch management algorithm can address the cases when there is a restriction on the number of simultaneous patches. This patch management algorithm (e.g., as implemented by the PMC 114) can schedule the patches across the allowed number of threads in such a way that no dependency constraint is violated, e.g., dependents of a service of application can be turned off before stopping a service and applying patches. To find a close to optimal schedule of patches, the patch management algorithm (e.g., as implemented by the PMC 114) can use one of a number of techniques, such as, for example, greedy and critical path. The greedy approach (scheduleGreedy) can reduce the time complexity of the patch management algorithm, and it just attempts to fit the current patch into the schedule of the patches of the previously selected patches. With regard critical path scheduling (scheduleCrit), for every sub problem K[i][j], the critical path scheduling (e.g., as implemented by the PMC 114) can always schedule the critical path first and then remove it from the pending patches. This critical path scheduling process can be repeated recursively until there are no patches left to schedule or all the threads are occupied for the time, W.

The patch management algorithm (e.g., as implemented by the PMC 114) can create an empty two-dimensional array K[(m+1)][(W+1)], wherein m can be the total number of updates (e.g., patches) and W can be the size of the window (e.g., maintenance time window) in which the services can be rebooted. The PMC 114 can initialize this array to zeros, wherein for each location, K[i][j] of this array can hold the following entries: given i updates and window size j, a map that can contain a subset of updates [1:i] and the estimated completion times of the updates, which can give a maximum accumulated score for the window size j; a maximum accumulated score achievable in the window size j; and a thread map that can contain a distribution of updates across multiple threads to achieve this maximum accumulated score. The solution can be the entry at the K[(m+1)][(W+1)] location.

With regard to filling up K and determining K[(m+1)][(W+1)], at each K[i][j] of the array, the PMC 114 can assign the initial maximum score to the score of K[i−1][pw]; can initialize the best subset of pods to be equal to the subset at K[i−1][j] and the thread map equal to that of K[i−1][j]; and can check if an update i can be added to the subset of updates located at K[i−1][pw], wherein pw:0−j without exceeding the window size j. This checking if update i can be added can be done using a greedy algorithm or a critical path first algorithm. If the update i can be added to the subset of updates, the PMC 114 can add the scores of all of the new pods/containers added to K[i−1][pw] and compare it with the previous maximum score; if the score obtained from adding the scores of all of the new pods/containers to K[i−1][l] is greater than the previous maximum score, the PMC 114 can update the three entries; and the PMC 114 can continue to perform the above operations until the PMC 114 has tried all pw:0−j. The PMC 114 can identify or determine the subset of patches associated with the maximum score (e.g., maximum or highest vulnerability score).

With regard to each dependency, if the time when the previous dependency is not there in the thread, the PMC 114 can add the time when the previous dependency ends to the thread, which can complete dependency earliest after the previous dependency ends (e.g., in accordance with greedy scheduling or critical path scheduling), check if the completion time does not exceed j, and add the score of current dependency to the total score.

In certain embodiments, the PMC 114 can apply still another patch management algorithm when there is no limit on simultaneous patches (threads). In this case, job scheduling and partitioning problem does not have to be solved. For each service that is deployed in a container, the PMC 114 can just check if the service can be restarted along with its dependencies within the given maintenance time window, because total offline patching time for a container is not dependent on the patches being applied. If the time to apply patches for container and restart its dependents is less than window size W, it can be patched during the maintenance time window (e.g., offline window). For VMs, offline patching time can be dependent upon the patches being applied. Since this can be no limit on the simultaneous patches, for each VM, the PMC 114 can run or implement a separate knapsack algorithm to determine and select an optimal subset of patches that can be applied in the given time. For each of this separate knapsack problem for VMs, the PMC 114 also can consider the time to restart the dependents, such as disclosed herein.

Figure 6:
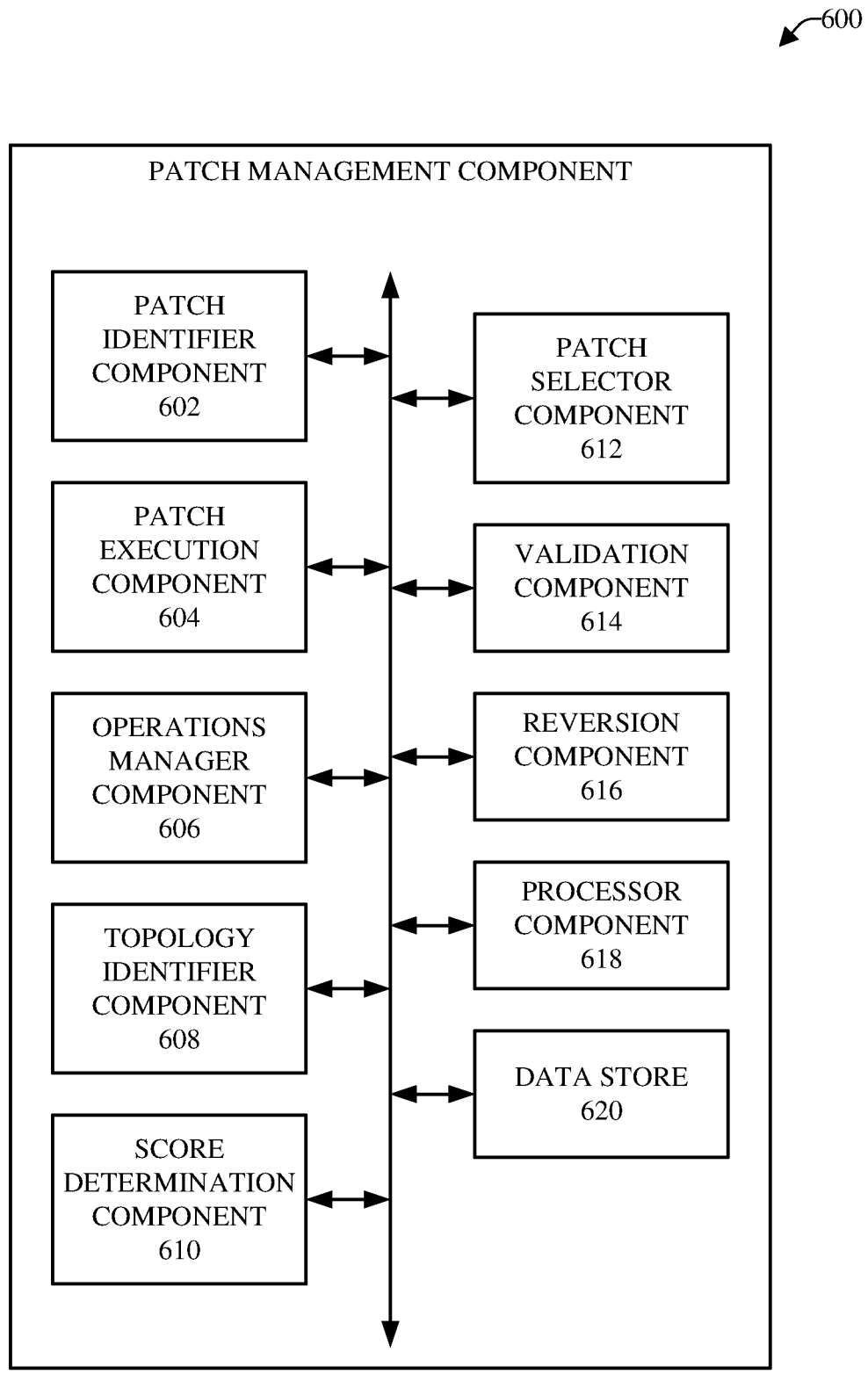
FIG. 6 illustrates a block diagram of an example patch management component 600, in accordance with various aspects and embodiments of the disclosed subject matter.

FIG. 6 illustrates a block diagram of an example PMC 600, in accordance with various aspects and embodiments of the disclosed subject matter. The PMC 600 can comprise a patch identifier component 602 and a patch execution component 604 that each can be the same as or similar to or can comprise the same or similar functionality as, respective components (e.g., respectively named components), as more fully described herein.

The PMC 600 can include an operations manager component 606 that can control (e.g., manage) operations associated with the PMC 600. For example, the operations manager component 606 can facilitate generating instructions to have components of the PMC 600 perform operations, and can communicate instructions to components (e.g., patch identifier component 602, patch execution component 604, . . . , processor component 618, data store 620, . . . ) of the PMC 600 to facilitate performance of operations by the components of the PMC 600 based at least in part on the instructions, in accordance with the defined patch management criteria, defined patch management algorithms (e.g., patch management algorithms as disclosed, defined, recited, embodied or indicated herein by the methods, systems, and techniques described herein). The operations manager component 606 also can facilitate controlling data flow between the components of the PMC 600 and controlling data flow between the PMC 600 and another component(s) or device(s) (e.g., computer, laptop computer or other type of computing or communication device) associated with (e.g., connected to) the PMC 600.

The PMC 600 also can comprise, for example, a topology identifier component 608, a score determination component 610, a patch selector component 612, a validation component 614, and a reversion component 616. The topology identifier component 608 can determine or identify the topology of a workload associated with a computing system (e.g., a hybrid workload associated with a hybrid cloud-based computing system). As part of determining the topology of the workload, the topology identifier component 608 can determine or identify dependencies between nodes or resources associated with the workload, to facilitate determining a dependency tree for the workload, and to facilitate efficiently determining which patches to apply during a maintenance time window, determining an order in which patches are to be applied (e.g., patches being performed to first workload portion offline), and applying patches to at least a desirable portion of the workload during the maintenance time window.

The score determination component 610 can determine patch-related scores for patches associated with a workload (e.g., vulnerability, importance or risk scores for patches associated with the workload or an overall, accumulated or group vulnerability, importance or risk score for subsets of patches associated with the workload) based at least in part on the results of analyzing the vulnerability or importance levels of patches (e.g., high, medium or low level of vulnerability), in accordance with the defined patch management criteria and associated applicable patch management algorithm. For instance, the score determination component 610 can utilize a desired patch management algorithm, such as, for example, a patch management algorithm described herein, to facilitate determining vulnerability scores for patches or group vulnerability scores for subsets (e.g., different groups) of patches, associated with the workload.

The patch selector component 612 can select or determine a subset of patches, from the set of patches, associated with the workload to perform during a maintenance time window based at least in part on the patch-related scores determined for the patches associated with the workload or the overall or accumulated patch-related scores for subsets of patches associated with the workload, in accordance with the defined patch management criteria, wherein at least a portion of the subset of patches is to be applied while a first workload portion of the workload is offline and another portion of the subset of the patches can be applied while a second workload portion of the workload is online. For example, the patch selector component 612 can select or determine the subset of patches, from the set of patches, associated with the workload to perform during a maintenance time window based at least in part on determining that the subset of patches associated with the workload has the highest group, overall or accumulated patch-related score as compared to other group, overall or accumulated patch-related scores of other subsets of patches associated with the workload, in accordance with the applicable patch management algorithm.

The validation component 614 can analyze the patches applied to the first workload portion or second workload portion or can analyze the resources, nodes, applications or data, etc., associated with the first workload portion or second workload portion, during the maintenance time window, while the resources, nodes or applications, etc., associated with the first workload portion are offline, to determine whether, and to validate (e.g., verify) that, the patches or the resources, nodes, applications or data, etc., associated with the first workload or second workload portion are performing appropriately subsequent to the patches being applied (e.g., web server performing appropriately, application server performing appropriately, database performing appropriately, including data being restored to the database, and nodes performing appropriately). If the validation component 614 determines that a patch is not validated (e.g., the patch or associated resource, node, application, etc., is not performing properly, in accordance with the defined patch management criteria), the validation component 614 can generate and present an indicator (e.g., a not-validated indicator) that can indicate such patch is not validated.

The reversion component 616 can revert (e.g., undo) a patch, within the maintenance time window, to return a workload item(s) (e.g., resource(s), node(s), application or data, etc.) back to a previous state before the patch was performed, in response to a determination that the patch is not validated. For example, during the maintenance time window, the reversion component 616 can receive a not-valid indicator relating to a patch that can indicate that the patch is not validated. In response to receiving the not-valid indicator, the reversion component 616 can revert the patch, within the maintenance time window, and can return the workload item(s) (e.g., resource(s), node(s), application or data, etc.) to a previous state of such workload item(s) before the patch was applied to the workload item(s).

The processor component 618 can work in conjunction with the other components (e.g., patch identifier component 602, patch execution component 604, operations manager component 606, . . . or data store 620, . . . ) to facilitate performing the various functions of the PMC 600. The processor component 618 can employ one or more processors, microprocessors or controllers that can process data, such as information relating to patches, workloads, cloud-computing environments, vulnerability scores, dependencies between nodes, resources, etc., associated with a workload, applications, operating systems, middleware, VMs, PMs, containers, resources, nodes, defined patch management criteria, defined patch management algorithms, traffic flows, policies, protocols, interfaces, tools or other information, to facilitate operation of the PMC 600, as more fully disclosed herein, and control data flow between the PMC 600 and other components (e.g., computer, laptop computer or other computing or communication device) associated with (e.g., connected to) the PMC 600.

The data store 620 can store data structures (e.g., user data, metadata), code structure(s) (e.g., modules, objects, hashes, classes, procedures) or instructions, information relating to patches, workloads, cloud-computing environments, vulnerability scores, dependencies between nodes, resources, etc., associated with a workload, applications, operating systems, middleware, VMs, PMs, containers, resources, nodes, defined patch management criteria, defined patch management algorithms, traffic flows, policies, protocols, interfaces, tools or other information, to facilitate controlling operations associated with the PMC 600. In an aspect, the processor component 622 can be functionally coupled (e.g., through a memory bus) to the data store 624 in order to store and retrieve information desired to operate or confer functionality, at least in part, to the patch identifier component 602, patch execution component 604, operations manager component 606, . . . or data store 620, etc. or substantially any other operational aspects of the PMC 600.

The systems or devices have been (or will be) described herein with respect to interaction between several components. It should be appreciated that such systems and components can include those components or sub-components specified therein, some of the specified components or sub-components or additional components. Sub-components could also be implemented as components communicatively coupled to other components rather than included within parent components. Further yet, one or more components or sub-components may be combined into a single component providing aggregate functionality. The components may also interact with one or more other components not specifically described herein for the sake of brevity, but known by those of skill in the art.

Figure 7:
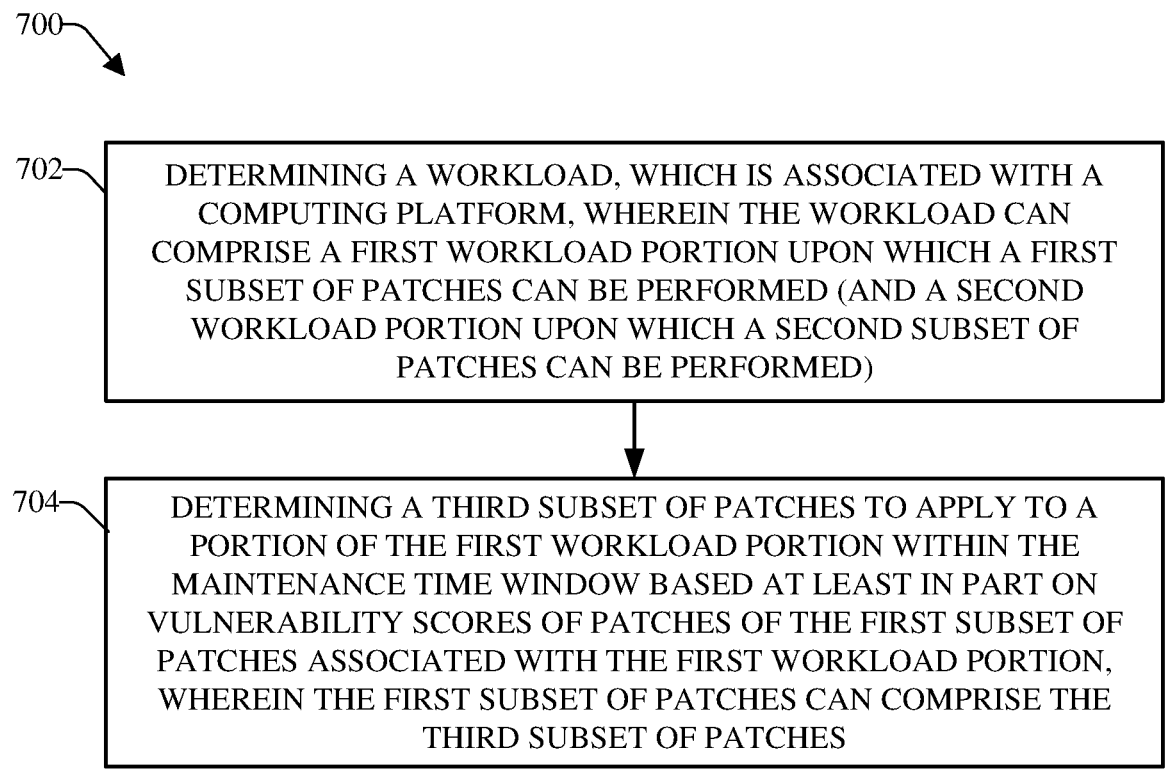
FIG. 7 depicts a flow diagram of another example, non-limiting method for managing patches associated with a computing platform, in accordance with various aspects and embodiments of the disclosed subject matter.

FIG. 7 illustrates a flow diagram of an example, non-limiting method 700 for managing patches associated with a computing platform, in accordance with various aspects and embodiments of the disclosed subject matter. The method 700 can be performed by, for example, a system comprising or operatively coupled to a patch identifier component, a PMC, a patch execution component or a processor component. Repetitive description of like elements employed in other embodiments described herein is or may be omitted for sake of brevity.

At 702, a workload, which is associated with a computing platform, can be determined, wherein the workload can comprise a first workload portion upon which a first subset of patches can be performed. The patch identifier component or PMC can identify or determine the workload (e.g., a hybrid workload), and can identify the first workload portion (e.g., applicable resources, nodes or applications, . . . ) upon which the first subset of patches can be performed while the first workload portion of the computing platform (e.g., a hybrid cloud computing environment) is offline during a maintenance time window, and also can identify or determine a second workload portion upon which a second subset of patches can be performed while the second workload portion is online.

At 704, a third subset of patches to apply to a portion of the first workload portion within the maintenance time window can be determined based at least in part on vulnerability scores of patches of the first subset of patches associated with the first workload portion, wherein the first subset of patches can comprise the third subset of patches. The PMC can determine the third subset of patches to apply to the portion (e.g., part) of the first workload portion within the maintenance time window, while the computing platform or applicable portion thereof, is offline, based at least in part on the vulnerability scores of patches of the first subset of patches associated with the first workload portion. For instance, the PMC can determine that there is not sufficient time during the maintenance time window to perform all of the patches in the first workload portion during that maintenance time window. The PMC can at least determine the vulnerability scores of the patches of the of the first subset of patches associated with the first workload portion. Based at least in part on the vulnerability scores of the patches, the PMC can determine, from the first subset of patches, the third subset of patches to apply to the portion of the first workload portion within the maintenance time window. At least some of the patches in the third subset of patches can have a relatively higher vulnerability score than other patches of the first subset of patches that were not selected by the PMC to be in the third subset of patches.

Figure 8:
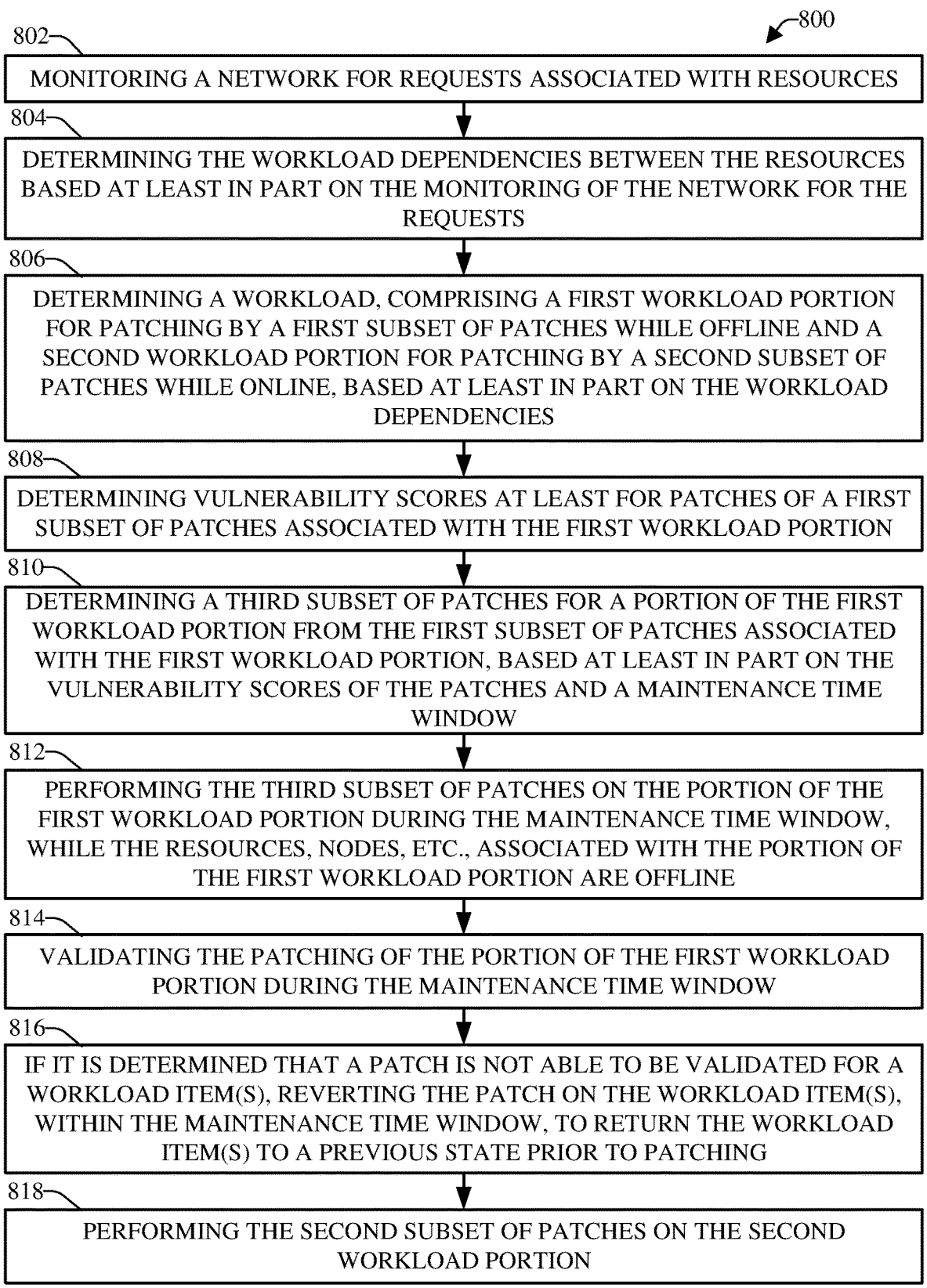
FIG. 8 presents a flow diagram of another example, non-limiting method for managing patches associated with a computing platform, in accordance with various aspects and embodiments of the disclosed subject matter.

FIG. 8 depicts a flow diagram of another example, non-limiting method 800 for managing patches associated with a computing platform, in accordance with various aspects and embodiments of the disclosed subject matter. The method 800 can be performed by, for example, a system comprising or operatively coupled to a patch identifier component, a PMC, a patch execution component or a processor component. Repetitive description of like elements employed in other embodiments described herein is or may be omitted for sake of brevity.

At 802, a network can be monitored for requests associated with resources to facilitate determining workload dependencies between resources. The PMC can monitor the network (e.g., computing or communication network) for requests associated with the resources (e.g., containers, VMs, PMs, other resources or nodes) to facilitate determining workload dependencies between the resources, wherein a workload dependency can be between a first type of item (e.g., node) and another type(s) of item(s) (e.g., VM or PM) or can be between items of the same type (e.g., a first VM and a second VM).

At 804, the workload dependencies between the resources can be determined based at least in part on the monitoring of the network for the requests. The PMC can determine the workload dependencies between the resources based at least in part on the monitoring of the network for the requests or through other means of determining such workload dependencies, as described herein. In some embodiments, the PMC can determine or identify the topology or dependency tree of the network based at least in part on the monitoring of the network for the requests, as described herein.

At 806, a workload, comprising a first workload portion for patching by a first subset of patches while offline and a second workload portion for patching by a second subset of patches while online, can be determined based at least in part on the workload dependencies. The PMC can determine the workload based at least in part on the dependencies associated with the workload. The workload can comprise the first workload portion, which can be workload items or resources (e.g., containers, VMs, PMs, other resources, nodes, . . . ) that are to be patched by the first subset of patches while offline (e.g., due at least in part to workload dependencies of such workload items), and the second workload portion that can be patched by the second subset of patches while online.

At 808, vulnerability scores can be determined at least for patches of a first subset of patches associated with the first workload portion. The PMC can determine (e.g., calculate) the vulnerability scores at least for patches of the first subset of patches that are to be performed on the first workload portion of the workload. In some embodiments, the PMC also can determine the vulnerability scores of patches of the second subset of patches.

At 810, a third subset of patches for a portion of the first workload portion can be determined from the first subset of patches associated with the first workload portion, based at least in part on the vulnerability scores of the patches and a maintenance time window, in accordance with the defined patch management criteria and an associated patch management algorithm. The PMC can determine the third subset of patches that can be applied to the portion (e.g., a subset of containers, VMs, PMs, other resources or nodes, . . . ) of the first workload portion from the first subset of patches associated with the first workload portion, based at least in part on the vulnerability scores of the patches and the maintenance time window, in accordance with the defined patch management criteria and an associated patch management algorithm, as more fully described herein.

At 812, the third subset of patches can be performed on the portion of the first workload portion during the maintenance time window, while the resources, nodes, etc., associated with the portion of the first workload portion are offline. The patch execution component can perform (e.g., apply) the third subset of patches on the portion of the first workload portion during the maintenance time window while the resources, nodes, applications, etc., of or associated with the portion of the first workload portion are offline. In some embodiments, the PMC can perform the patches of the third subset of patches in topological order, in accordance with the topology of the network. In certain embodiments, the patch execution component can perform patches of the third subset of patches simultaneously (e.g., in parallel) on multiple items (e.g., containers, VMs, PMs, other resources or nodes, . . . ), including items with dependencies, of the portion of the first workload portion within the available maintenance time window. The PMC and patch execution component can perform the patching process to facilitate perform the third subset of patches, wherein the patching process can comprise stopping and restarting resources associated with the portion of the first workload portion and rebooting nodes associated with the third subset of patches, as more fully described herein.

At 814, the patching of the portion of the first workload portion can be validated during the maintenance time window. The PMC can validate the patching of the portion of the first workload portion within the maintenance time window to facilitate ensuring that the patches were applied properly, and ensuring that the patches and the respective items of the portion of the first workload portion, and the computing system overall, are performing properly after such patches have been applied.

At 816, if it is determined that a patch is not able to be validated for a workload item(s) of the portion of the first workload portion, the patch on the workload item(s) can be reverted, within the maintenance time window, to return the workload item(s) to a previous state prior to patching. The PMC can determine whether the patch is validated with respect to the workload item(s) (e.g., container(s), VM(s), PM(s), other resource(s) or node(s), . . . ). In response to determining that the patch is not able to be validated with respect to the workload item(s), the PMC or patch execution component can revert the patch on the workload item(s), within the maintenance time window, to return the workload item(s) to its previous state prior to the patching.

At 818, the second subset of patches can be performed on the second workload portion. The patch execution component can perform the second subset of patches on the second workload portion, wherein the second subset of patches can be performed while at least the second workload portion is online or can be performed during the maintenance time window or outside the maintenance time window. In certain embodiments, the patch execution component can perform at least a portion of the patches of the second subset of patches on the second workload portion simultaneously (e.g., in parallel) with a portion of the patches of the third subset of patches being performed on the portion of the first workload portion during the maintenance time window.

The PMC also can validate the patches performed on the second workload portion to facilitate ensuring that the patches were applied properly, and ensuring that the patches and the respective items of the portion of the second workload portion, and the computing system overall, are performing properly after such patches have been applied. The PMC can determine whether a particular patch is validated with respect to a workload item(s). In response to determining that the particular patch is not able to be validated with respect to the workload item(s), the PMC or patch execution component can revert the patch on the workload item(s) to return the workload item(s) to its previous state prior to the patching.

For simplicity of explanation, the methods or computer-implemented methods are depicted and described as a series of acts. It is to be understood and appreciated that the disclosed subject matter is not limited by the acts illustrated or by the order of acts, for example acts can occur in various orders or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 9:
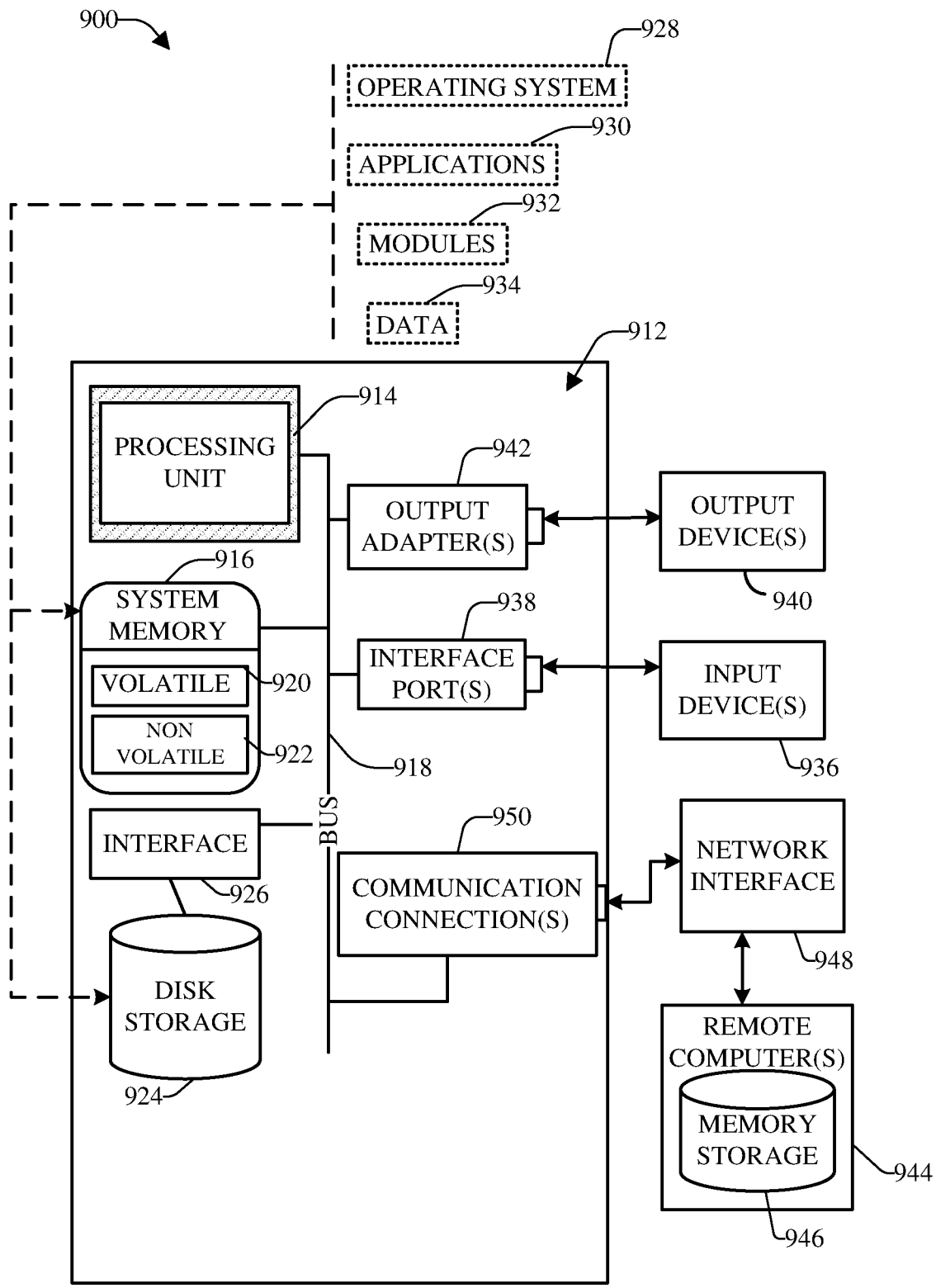
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is or may be omitted for sake of brevity. With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory or nonvolatile random access memory (RAM) (e.g., ferroelectric RAM (FeRAM)). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM).

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a method of connection between the output device 940 and the system bus 918. It should be noted that other devices or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

One or more embodiments can be a system, a method, an apparatus or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can include the following: a portable computer diskette, a hard disk, a RAM, a ROM, an erasable programmable read-only memory (EPROM or Flash memory), a SRAM, a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry or either source code or object code written in any combination of one or more programming languages, including an object oriented programming language such as Smalltalk, C++ or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN) or the connection can be made to an external computer (for example, through the Internet using an Internet Service Provider). In some embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations or block diagrams of methods, apparatus (systems), and computer program products according to embodiments of the subject disclosure. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create method for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can be implemented in combination with other program modules. Generally, program modules include routines, programs, components, data structures, etc. that perform particular tasks or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include ROM, PROM, EPROM, EEPROM, flash memory or nonvolatile RAM (e.g., FeRAM). Volatile memory can include RAM, which can act as external cache memory, for example. By way of illustration and not limitation, RAM is available in many forms such as SRAM, DRAM, SDRAM, DDR SDRAM, ESDRAM, SLDRAM, DRRAM, DRDRAM, and RDRAM. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace or to enable others of ordinary skill in the art to understand the embodiments disclosed herein.

What is claimed is:

1. A system, comprising:
a memory that stores computer-executable components; and
a processor, operatively coupled to the memory, that executes computer-executable components, the computer-executable components comprising:
a patch identifier component that identifies a workload associated with a set of patches associated with a hybrid cloud-based computing platform, wherein the workload comprises a first workload portion upon which a first subset of patches is to be performed, and comprises a second workload portion;
a patch management component that:
determines a second subset of patches to execute with respect to a portion of the first workload portion within a maintenance time window based on vulnerability scores of patches of the first subset of patches, wherein the first subset of patches comprises the second subset of patches, and
determines a third subset of patches to execute with respect to the second workload portion, wherein the set of patches comprises the first subset of patches, the second subset of patches, and the third subset of patches; and
a patch execution component that executes the second subset of patches with respect to the portion of the first workload portion within the maintenance time window while the first workload portion of the hybrid cloud-based computing platform is offline, and executes the third subset of patches with respect to the second workload portion while the second workload portion of the hybrid cloud-based computing platform is online.

2. The system of claim 1, wherein the patch execution component executes at least a portion of the patches of the second subset of the patches simultaneously, wherein the hybrid cloud-based computing platform comprises nodes and resources, wherein the nodes comprise a first node associated with a first tier of the first workload portion and a second node associated with a second tier of the first workload portion, and wherein the second node is dependent upon the first node.

3. The system of claim 1, wherein the hybrid cloud-based computing platform comprises nodes and resources, wherein the patch management component determines a topology of the workload comprising a determination of dependencies across the nodes of the hybrid cloud-based computing platform, and, based on the topology, determines a topological order for execution of the second subset of the patches with respect to the first workload portion, and wherein the patch execution component executes the patches of the second subset of the patches in accordance with the topological order.

4. The system of claim 1, wherein the patch execution component executes at least a patch of the second subset of patches simultaneously with at least another patch of the third subset of patches.

5. The system of claim 1, wherein the maintenance time window is a time period during which nodes and resources of the hybrid cloud-based computing platform and associated with the first workload portion are offline.

6. The system of claim 1, wherein the patch management component determines the vulnerability scores of the patches of the first subset of patches associated with the first workload portion based on defined levels of importance of the patches, and determines the second subset of patches based on a determination that the second subset of patches has a higher overall vulnerability score than other overall vulnerability scores of other subsets of patches.

7. The system of claim 1, wherein the hybrid cloud-based computing platform comprises nodes and resources, wherein a node of the nodes is selected from a group of nodes consisting of a virtual machine, a physical machine, and a container, and wherein a first patch of the patches is executed on a virtual machine instance of the virtual machine, a second patch of the patches is executed on a physical machine instance of the physical machine, and a third patch of the patches is executed on a container image of the container.

8. The system of claim 1, wherein the patch management component suspends operation of nodes and resources associated with the second subset of patches, wherein the computer-executable components comprise a patch execution component that executes the second subset of patches with respect to the nodes and the resources in response to the suspension of the operation, and wherein the patch management component validates that the second subset of patches was executed successfully, and, in response to the validation that the second subset of patches was executed successfully, re-starts the operation of the nodes and the resources.

9. The system of claim 1, wherein the patch management component tests whether an application is in a defined healthy operational state in response to a patch of the second subset of patches being executed with respect to the application, and wherein, in response to a determination that the application is not in the defined healthy operational state, the patch management component reverts implementation of the patch with respect to the application within the maintenance time window to revert the application to a previous state that existed prior to the execution of the patch with respect to the application.

10. The system of claim 1, wherein the workload is a hybrid workload spanning multiple dimensions and relating to characteristics selected from a group of characteristics of the hybrid cloud-based computing platform consisting of a number of cloud-based computing sub-platforms, a number of operating systems, a type of cloud deployment model, a type of deployment of resources, a type of workload, a frequency of execution of workloads, and development and operations processes.

11. The system of claim 1, wherein the patch management component identifies unapplied patches that were not executed during the maintenance time window and determines a next maintenance time window to execute at least a portion of the unapplied patches.

12. A computer-implemented method, comprising:
determining, by a system operatively coupled to a processor, a workload that is associated with a set of patches associated with a hybrid cloud-based computing platform, wherein the workload comprises a first workload portion upon which a first subset of patches is to be performed, and comprises a second workload portion;
determining, by the system, a second subset of patches to apply to a portion of the first workload portion within a maintenance time window based on vulnerability scores of patches of the first subset of patches, wherein the first subset of patches comprises the second subset of patches;
determining, by the system, a third subset of patches to apply to the second workload portion wherein the set of patches comprises the first subset of patches, the second subset of patches, and the third subset of patches;
applying, by the system, the second subset of patches to the portion of the first workload portion within the maintenance time window while at least part of the first workload portion of the hybrid cloud-based computing platform is offline; and
applying, by the system, the third subset of patches to the second workload portion while the second workload portion of the hybrid cloud-based computing platform is online.

13. The computer-implemented method of claim 12, wherein a first patch and a second patch of the second subset patches are applied in parallel, the maintenance time window is a time period during which nodes and resources of the hybrid cloud-based computing platform and associated with the first workload portion are offline, and a third patch of the third subset of patches and the first patch are applied in parallel.

14. The computer-implemented method of claim 12, further comprising:
determining, by the system, the vulnerability scores of the patches of the first subset of patches associated with the first workload portion based on defined levels of vulnerability of the patches; and
determining, by the system, that the second subset of patches has a higher total vulnerability score than other total vulnerability scores of other subsets of patches, wherein the determining the second subset of patches to apply to the portion of the first workload portion within the maintenance time window comprises determining the second subset of patches based on the determining that the second subset of patches has the higher total vulnerability score.

15. The computer-implemented method of claim 12, further comprising:
suspending, by the system, operation of nodes and resources associated with the second subset of patches;
applying, by the system, the second subset of patches to the nodes and the resources in response to the suspending of the operation;
verifying, by the system, that the second subset of patches was successfully applied to the nodes and the resources; and
in response to the verifying that the second subset of patches was successfully applied to the nodes and the resources, re-starting, by the system, the operation of the nodes and the resources.

16. The computer-implemented method of claim 12, further comprising:
in response to a patch of the second subset of patches being applied with respect to an application, performing, by the system, a test to determine whether the application is in a defined usable operational state; and
in response to determining that the application is not in the defined usable operational state, within the maintenance time window, reverting, by the system, implementation of the patch with respect to the application to revert the application to a previous state that existed prior to the applying of the patch with respect to the application.

17. A computer program product that facilitates managing patching for a hybrid cloud-based computing platform, the computer program product comprising a computer readable storage medium having program instructions embodied therewith, the program instructions are executable by a processor to cause the processor to:
determine a workload that is associated with a set of patches associated with the hybrid cloud-based computing platform, wherein the workload comprises a first workload portion upon which a first subset of patches is to be performed, and comprises a second workload portion;
determine a second subset of patches to apply to a portion of the first workload portion within a downtime window based on vulnerability scores of patches of the first subset of patches, wherein the first subset of patches comprises the second subset of patches;
determine a third subset of patches to apply to the second workload portion, wherein the set of patches comprises the first subset of patches, the second subset of patches, and the third subset of patches;
apply the second subset of patches to the portion of the first workload portion within the downtime window while at least part of the first workload portion of the hybrid cloud-based computing platform is offline; and
apply the third subset of patches to the second workload portion while the second workload portion of the hybrid cloud-based computing platform is online.

18. The computer program product of claim 17, wherein a first patch and a second patch of the second subset patches are applied simultaneously, the downtime window is a time period during which nodes and resources of the hybrid cloud-based computing platform and associated with the first workload portion are offline, and a third patch of the third subset of patches and the first patch are applied simultaneously.

19. A system, comprising:
a memory that stores computer-executable components; and
a processor, operatively coupled to the memory, that executes computer-executable components, the computer-executable components comprising:
  an update identifier component that identifies a workload that is associated with a set of updates associated with a hybrid cloud-based a computing platform, wherein the workload comprises a first workload portion upon which a first subset of updates is to be performed and a second workload portion upon which a second subset of updates is to be performed;
  an update management component that determines a third subset of updates to apply to a portion of the first workload portion within a maintenance time period based on vulnerability scores of updates of the first subset of updates associated with the first workload portion, wherein the first subset of updates comprises the third subset of updates, and the set of updates the first subset of updates, the second subset of updates, and the third subset of updates; and
  an update execution component that applies the third subset of updates to the first workload portion within the maintenance time period while at least part of the first workload portion of the hybrid cloud-based computing platform is offline and applies the second subset of updates to the second workload portion while the second workload portion of the hybrid cloud-based computing platform is online.

20. The system of claim 19, wherein the maintenance time window is a time period during which nodes and resources of the hybrid cloud-based computing platform and associated with the first workload portion are offline.

21. The system of claim 19, wherein a first patch and a second patch of the second subset patches are applied simultaneously, the downtime window is a time period during which nodes and resources of the hybrid cloud-based computing platform and associated with the first workload portion are offline, and a third patch of the third subset of patches and the first patch are applied simultaneously.

22. A computer program product that facilitates managing updating of a hybrid cloud-based computing platform, the computer program product comprising a computer readable storage medium having program instructions embodied therewith, the program instructions are executable by a processor to cause the processor to:
  identify a workload that is associated with a set of updates associated with the hybrid cloud-based computing platform, wherein the workload comprises a first workload portion upon which a first subset of updates is to be performed and a second workload portion upon which a second subset of updates is to be performed;
  determine a third subset of updates to apply to a portion of the first workload portion within an offline maintenance time period based on vulnerability scores of updates of the first subset of updates associated with the first workload portion, wherein the first subset of updates comprises the third subset of updates, and the set of updates the first subset of updates, the second subset of updates, and the third subset of updates;
  apply the third subset of updates to the first workload portion within the offline maintenance time period while at least part of the first workload portion of the hybrid cloud-based computing platform is offline; and
  apply the second subset of updates to the online workload while the second workload portion of the hybrid cloud-based computing platform is online.

23. The computer program product of claim 22, wherein the maintenance time window is a time period during which nodes and resources of the hybrid cloud-based computing platform and associated with the first workload portion are offline.

24. The computer program product of claim 22, wherein the hybrid cloud-based computing platform comprises nodes and resources, wherein a node of the nodes is selected from a group of nodes consisting of a virtual machine, a physical machine, and a container, and wherein a first patch of the patches is executed on a virtual machine instance of the virtual machine, a second patch of the patches is executed on a physical machine instance of the physical machine, and a third patch of the patches is executed on a container image of the container.

25. The computer program product of claim 22, wherein a first patch and a second patch of the second subset patches are applied simultaneously, the downtime window is a time period during which nodes and resources of the hybrid cloud-based computing platform and associated with the first workload portion are offline, and a third patch of the third subset of patches and the first patch are applied simultaneously.

* * * * *